US012647950B2

(12) United States Patent
Yang

(10) Patent No.: US 12,647,950 B2
(45) Date of Patent: Jun. 2, 2026

(54) CHANNEL DETERMINING METHOD AND APPARATUS

(71) Applicant: HUAWEI TECHNOLOGIES CO., LTD., Shenzhen (CN)

(72) Inventor: Fan Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 17/672,038

(22) Filed: Feb. 15, 2022

(65) Prior Publication Data

US 2022/0174669 A1 Jun. 2, 2022

Related U.S. Application Data

(63) Continuation of application No. PCT/CN2019/101207, filed on Aug. 16, 2019.

(51) Int. Cl.
*H04W 72/56* (2023.01)
*H04W 72/0446* (2023.01)

(52) U.S. Cl.
CPC ....... *H04W 72/0446* (2013.01); *H04W 72/56* (2023.01)

(58) Field of Classification Search
CPC . H04W 72/0446; H04W 72/56; H04W 72/20; H04W 72/569
See application file for complete search history.

(56) References Cited

U.S. PATENT DOCUMENTS

2018/0352582 A1* 12/2018 Yi ........................ H04W 74/006
2020/0322972 A1* 10/2020 Hosseini ............... H04W 72/23
2020/0344781 A1 10/2020 Li et al.
2021/0144702 A1* 5/2021 Zhao .................... H04W 72/23

FOREIGN PATENT DOCUMENTS

CN 108702776 A 10/2018
CN 110034905 A 7/2019
WO 2019137213 A1 7/2019

OTHER PUBLICATIONS

Qualcomm (Remaining issues for overlapping UL transmissions, R1-1807359, May 2018).*

(Continued)

*Primary Examiner* — Lakeram Jangbahadur
(74) *Attorney, Agent, or Firm* — WOMBLE BOND DICKINSON (US) LLP

(57) ABSTRACT
This application provides a channel determining method and an apparatus. In a communication process between a base station and a terminal device, when one channel conflicts with a plurality of channels at the same time, but any two channels among the plurality of channels do not conflict, a same rule may be used so that the base station and the terminal device determine a to-be-transmitted channel according to a predefined processing sequence. Specifically, a channel conflict resolution sequence is determined based on a type of information carried on a channel, a sending time sequence of a conflicting channel, a scheduling sequence of the conflicting channel, a different service type carried on the conflicting channel, or a priority of information carried on the conflicting channel.

18 Claims, 15 Drawing Sheets

System 100

Network device 101

Terminal device 102

Terminal device 103

Terminal device 104

(56)  References Cited

OTHER PUBLICATIONS

R1-1807359, Qualcomm Incorporated, Remaining issues for overlapping UL transmissions, 3GPP TSG RAN WG1 Meeting #93, Busan, Korea, May 21-25, 2018, total 12 pages.

3GPP TS 38.213 V15.6.0 (Jun. 2019)3rd Generation Partnership Project; Technical Specification Group Radio Access Network;NR;Physical layer procedures for control(Release 15), total 107 pages.

R1-1807773, Qualcomm Incorporated, Summary of remaining issues for overlapping UL transmissions, 3GPP TSG RAN WG1 Meeting #93, Busan, Korea, May 21-25, 2018, total 14 pages.

R1-1807820, Qualcomm Incorporated, Summary of remaining issues for overlapping UL transmissions, 3GPP TSG RAN WG1 Meeting #93, Busan, Korea, May 21-25, 2018, total 15 pages.

* cited by examiner

System 100

500

| HARQ-ACK for URLLC (PUCCH) | | HARQ-ACK for eMBB (PUCCH) |

| SP-CSI for URLLC (PUSCH) | | SP-CSI for eMBB (PUSCH) |

Timeslot n

Step 1

| SP-CSI & HARQ for URLLC (PUSCH) | | SP-CSI & HARQ for eMBB (PUSCH) |

Timeslot n     Step 2

CHANNEL DETERMINING METHOD AND APPARATUS

CROSS-REFERENCE TO RELATED APPLICATIONS

This application is a continuation of International Application No. PCT/CN2019/101207, filed on Aug. 16, 2019, the disclosure of which is hereby incorporated by reference in its entirety.

TECHNICAL FIELD

This application relates to the communication field, and more specifically, to a channel determining method and an apparatus.

BACKGROUND

In a fifth generation (5G) mobile communication system, sending an uplink and a sidelink is restricted by a capability of user equipment (UE), transmit power and channel environment, and a plurality of channels or reference signals cannot be sent at the same time, for example, a physical uplink control channel (PUCCH), a physical uplink shared channel (PUSCH), a physical sidelink control channel (PSCCH), a physical sidelink feedback channel (PSFCH), and a physical sidelink data channel (PSSCH). Different channels may be restricted and cannot be sent at the same time regardless of whether they use a same carrier or different carriers.

To avoid sending the different channels at the same time, a base station is required to avoid a conflict between different channels as much as possible during scheduling. In addition, when the conflict cannot be avoided, a corresponding rule is defined to determine which channel needs to be used to send information so that an agreement is reached between the base station and UE. However, when the plurality of channels conflict with a same channel at the same time, a current problem that needs to be resolved is to keep consistency between the base station and the UE in a resource determining process. This further meets a sending requirement of a terminal device and improves reliability of uplink or sidelink transmission.

SUMMARY

This application provides a channel determining method and an apparatus, to determine a transmission channel for a base station and a terminal device. This can improve transmission reliability.

According to a first aspect, a channel determining method is provided, including: when a first channel overlaps each of a plurality of channels in time domain, and the plurality of channels do not overlap each other in time domain, determining a second channel from the plurality of channels based on first parameter information and determining a to-be-sent channel from the first channel and the second channel.

It should be understood that, in this application, the first channel may be a PUSCH, for example, a PUSCH that does not carry an uplink shared channel (UL-SCH), that is, a PUSCH that carries aperiodic channel state information A-CSI or a PUSCH that carries semi-persistent channel state information SP-CSI. Each of the plurality of channels may be the PUSCH and/or a PUCCH, for example, a PUSCH and/or a PUCCH that carry/carries an SR, CSI, or a HARQ. This is not limited in this application.

It should be further understood that the first channel in this application may be a PSSCH, for example, a PSSCH that carries A-CSI. The plurality of channels may be PSCCHs and/or PSFCHs. This is not limited in this application.

It should be further understood that, in this application, the plurality of channels include at least two channels. The plurality of channels do not overlap each other in time domain, that is, no conflict occurs. However, each of the plurality of channels overlaps the first channel in time domain, that is, a conflict occurs.

For example, the PUCCH that carries the SR and the PUCCH carries the HARQ conflict with the PUSCH that carries the A-CSI at the same time, but the PUCCH that carries the SR does not conflict with the PUCCH that carries the HARQ. In this case, the PUCCH that carries the SR and the PUCCH that carries the HARQ may be understood as two channels of the plurality of channels in this application, and the PUSCH that carries the A-CSI may be understood as the first channel in this application. A quantity of channels included in the plurality of channels is not limited in this application.

A terminal device and a base station may determine the second channel from the plurality of channels based on the first parameter information. It may be understood that the terminal device and the base station select one channel from the plurality of channels as the second channel, to first resolve a conflict between the first channel and the second channel. It should be understood that the second channel may be understood as a channel that is preferentially selected to resolve the conflict with the first channel.

It should be further understood that the "to-be-sent channel" herein may be referred to as a "to-be-received channel" on a base station side. The "to-be-sent channel" herein is not necessarily a channel finally sent by the terminal device to the base station. In an embodiment, after the conflict between the first channel and the second channel is resolved, if the first channel is reserved as the to-be-sent channel, the first channel still conflicts with another channel in the plurality of channels. In this application, the another channel continues to be selected from the plurality of channels and the conflict with the first channel continues to be resolved. Until there is no conflict, a last reserved channel is finally sent. Alternatively, after the conflict between the first channel and the second channel is resolved, if the second channel is reserved as the to-be-sent channel, the second channel does not conflict with another channel in the plurality of channels. The second channel is the to-be-sent channel herein and the terminal device sends the second channel to the base station or another terminal device. This is not limited in this application.

It should be further understood that the first parameter information may be understood as a parameter used to select a channel from the plurality of channels. In other words, the terminal device and the base station may set a channel conflict resolution sequence based on the first parameter information, select the second channel based on the first parameter, to first resolve the conflict between the first channel and the second channel. If a similar conflict occurs later, the method in this application is repeated until the conflict is resolved.

With reference to the first aspect, in some implementations of the first aspect, the first parameter information includes information about a start time unit for sending each of the plurality of channels, and an index of a time unit for sending the second channel is smallest among indexes of time units of the plurality of channels.

According to the foregoing solution, the base station and the terminal device may determine a channel conflict resolution sequence based on a time unit corresponding to a sending time domain position of a conflicting channel. In other words, a conflict of a channel whose sending start time is earlier is preferentially processed. The channel determining method may retain and send as much control information as possible. This can improve reliability of transmission between the base station and the terminal device or between terminal devices.

With reference to the first aspect, in an embodiment, the first parameter information includes information about a start symbol of each of the plurality of channels, and an index of a start symbol of the second channel is smallest among indexes of start symbols of the plurality of channels.

According to the foregoing solution, the base station and the terminal device may determine the channel conflict resolution sequence based on a start symbol of the conflicting channel. In other words, a conflict of a channel whose start symbol is earlier is preferentially processed. The channel determining method may retain and send as much the control information as possible. This can improve the reliability of the transmission between the base station and the terminal device or between the terminal devices.

With reference to the first aspect, in an embodiment, the method further includes: receiving a plurality of pieces of signaling, where the plurality of pieces of signaling are used to indicate time units for sending the plurality of channels, the first parameter information includes information about start time units for receiving the plurality of pieces of signaling, and an index of a time unit used to indicate signaling of the second channel is smallest among indexes of time units of the plurality of pieces of signaling.

According to the foregoing solution, the base station and the terminal device may determine the channel conflict resolution sequence based on receiving time of scheduling signaling of the conflicting channel. In other words, a conflict of a channel that is scheduled earlier is preferentially processed. The channel determining method may retain and send as much the control information as possible. This can improve the reliability of the transmission between the base station and the terminal device or between the terminal devices.

With reference to the first aspect, in an embodiment, the first parameter information includes information about a different service type carried on each of the plurality of channels.

With reference to the first aspect, in an embodiment, the first channel and the second channel carry a same service.

According to the foregoing solution, the base station and the terminal device may determine the channel conflict resolution sequence based on a type of a service carried on the conflicting channel. In other words, a conflict of a channel that carries a higher-priority service is preferentially processed. The channel determining method may retain and send as much the control information as possible. This can improve the reliability of the transmission between the base station and the terminal device or between the terminal devices.

With reference to the first aspect, in an embodiment, the first parameter information includes priority information of information carried on each of the plurality of channels.

According to the foregoing solution, the base station and the terminal device may determine the channel conflict resolution sequence based on a priority of information carried on the conflicting channel. In other words, a conflict of a channel that carries higher-priority information is preferentially processed. The channel determining method may retain and send as much the control information as possible. This can improve the reliability of the transmission between the base station and the terminal device or between terminal devices.

With reference to the first aspect, in an embodiment, the plurality of channels are used to carry the control information and the first parameter information includes a type of the control information carried on the plurality of channels.

With reference to the first aspect, in an embodiment, the method further includes: determining a channel that overlaps each of the plurality of channels in time domain as the first channel.

According to the foregoing technical solution, in a communication process between the base station and the terminal device, when one channel conflicts with the plurality of channels at the same time, but any two channels among the plurality of channels do not conflict, a same rule may be used so that the base station and the terminal device determine a to-be-transmitted channel according to a predefined processing sequence. Specifically, the base station and the terminal device may determine the channel conflict resolution sequence based on a type of information carried on a channel such as a type of uplink control information UCI or a type of sidelink control information SCI, a sending time sequence of the conflicting channel, a scheduling sequence of the conflicting channel, different service types carried on the conflicting channel, or the priority of information carried on the conflicting channel. The channel determining method may retain and send as much the control information as possible. This can improve the reliability of the transmission between the base station and the terminal device or between the terminal devices.

According to a second aspect, a channel determining method is provided, including: when a first channel overlaps each of a plurality of channels in time domain, and the plurality of channels do not overlap each other in time domain, determining a second channel from the plurality of channels based on first parameter information and determining a to-be-received channel from the first channel and the second channel.

With reference to the second aspect, in an embodiment, the first parameter information includes information about a start time unit for sending each of the plurality of channels, and an index of a time unit for sending the second channel is smallest among indexes of time units of the plurality of channels.

With reference to the second aspect, in an embodiment, the first parameter information includes information about a start symbol of each of the plurality of channels, and an index of a start symbol of the second channel is smallest among indexes of start symbols of the plurality of channels.

With reference to the second aspect, in an embodiment, the method further includes: sending a plurality of pieces of signaling, where the plurality of pieces of signaling are used to indicate time units for sending the plurality of channels, the first parameter information includes information about start time units for receiving the plurality of pieces of signaling, and an index of a time unit used to indicate signaling of the second channel is smallest among indexes of time units of the plurality of pieces of signaling.

With reference to the second aspect, in an embodiment the first parameter information includes information about a different service type carried on each of the plurality of channels.

With reference to the second, in an embodiment, the first channel and the second channel carry a same type of service.

With reference to the second aspect, in an embodiment, the first parameter information includes priority information of information carried on each of the plurality of channels.

With reference to the second aspect, in an embodiment, the plurality of channels are used to carry control information and the first parameter information includes a type of the control information carried on the plurality of channels.

With reference to the second aspect, in an embodiment, the method further includes: determining a channel that overlaps each of the plurality of channels in time domain as the first channel.

According to a third aspect, a channel determining apparatus is provided, including: a first processing unit, configured to determine a second channel from a plurality of channels, based on first parameter information, when a first channel overlaps each of the plurality of channels in time domain and the plurality of channels do not overlap each other in time domain; and a second processing unit, configured to determine a to-be-sent channel from the first channel and the second channel.

With reference to the third aspect, in some implementations of the third aspect, the first parameter information includes information about a start time unit for sending each of the plurality of channels, and an index of a time unit for sending the second channel is smallest among indexes of time units of the plurality of channels.

With reference to the third aspect, in an embodiment, the first parameter information includes information about a start symbol of each of the plurality of channels, and an index of a start symbol of the second channel is smallest among indexes of start symbols of the plurality of channels.

With reference to the third aspect, in an embodiment, the apparatus further includes: a communication unit, configured to receive a plurality of pieces of signaling, where the plurality of pieces of signaling are used to indicate time units for sending the plurality of channels, the first parameter information includes information about start time units for receiving the plurality of pieces of signaling, and an index of a time unit used to indicate signaling of the second channel is smallest among indexes of time units of the plurality of pieces of signaling.

With reference to the third aspect, in an embodiment, the first parameter information includes information about a different service type carried on each of the plurality of channels.

With reference to the third aspect, in an embodiment, the first channel and the second channel carry a same type of service.

With reference to the third aspect, in an embodiment, the first parameter information includes priority information of information carried on each of the plurality of channels.

With reference to the third aspect, in an embodiment, the plurality of channels are used to carry control information and the first parameter information includes a type of the control information carried on the plurality of channels.

With reference to the third aspect, in an embodiment, the first processing unit is further configured to determine a channel that overlaps each of the plurality of channels in time domain as the first channel.

According to a fourth aspect, a channel determining apparatus is provided, including: a first processing unit, configured to determine a second channel from a plurality of channels, based on first parameter information, when a first channel overlaps each of the plurality of channels in time domain and the plurality of channels do not overlap each other in time domain; and a second processing unit, configured to determine a to-be-sent channel from the first channel and the second channel.

With reference to the fourth aspect, in an embodiment, the first parameter information includes information about a start time unit for sending each of the plurality of channels, and an index of a time unit for sending the second channel is smallest among indexes of time units of the plurality of channels.

With reference to the fourth aspect, in an embodiment, the first parameter information includes information about a start symbol of each of the plurality of channels, and an index of a start symbol of the second channel is smallest among indexes of start symbols of the plurality of channels.

With reference to the fourth aspect, in an embodiment, the apparatus further includes: a communication unit, configured to send a plurality of pieces of signaling, where the plurality of pieces of signaling are used to indicate time units for sending the plurality of channels, the first parameter information includes information about start time units for receiving the plurality of pieces of signaling, and an index of a time unit used to indicate signaling of the second channel is smallest among indexes of time units of the plurality of pieces of signaling.

With reference to the fourth aspect, in an embodiment, the first parameter information includes information about a different service type carried on each of the plurality of channels.

With reference to the fourth aspect, in an embodiment, the first channel and the second channel carry a same type of service.

With reference to the fourth aspect, in an embodiment, the first parameter information includes priority information of information carried on each of the plurality of channels.

With reference to the fourth aspect, in an embodiment, the plurality of channels are used to carry control information and the first parameter information includes a type of the control information carried on the plurality of channels.

With reference to the fourth aspect, in an embodiment, the first processing unit is further configured to determine a channel that overlaps each of the plurality of channels in time domain as the first channel.

According to a fifth aspect, an apparatus is provided. The apparatus has functions of implementing the terminal device in the method designs of the first aspect. The functions may be implemented by hardware, or may be implemented by executing corresponding software by the hardware. The hardware or the software includes one or more units corresponding to the functions.

According to a sixth aspect, an apparatus is provided. The apparatus has functions of implementing the network device (for example, a base station) in the method designs of the second aspect. The functions may be implemented by hardware, or may be implemented by executing corresponding software by the hardware. The hardware or the software includes one or more units corresponding to the functions.

According to a seventh aspect, a terminal device including a transceiver and a processor is provided. In an embodiment, the terminal device further includes a memory. The processor is configured to control the transceiver to send and receive a signal. The memory is configured to store a computer program. The processor is configured to invoke the computer program from the memory and run the computer program, so that the terminal device performs the method according to any one of the first aspect or the possible implementations of the first aspect.

According to an eighth aspect, a network device including a transceiver and a processor is provided. In an embodiment, the network device further includes a memory. The processor is configured to control the transceiver to send and receive a signal. The memory is configured to store a computer program. The processor is configured to invoke the computer program from the memory and run the computer program, so that the network device performs the method according to any one of the second aspect or the possible implementations of the second aspect.

According to a ninth aspect, a communication system is provided. The system includes the terminal device in the third aspect and the network device in the fourth aspect.

According to a tenth aspect, a communication apparatus is provided. The communication apparatus may be the terminal device in the foregoing method designs or a chip disposed in the terminal device. The communication apparatus includes a processor. The processor is coupled to a memory, and may be configured to execute instructions in the memory, to implement the method performed by the terminal device according to any one of the first aspect or the possible implementations of the first aspect. In an embodiment, the communication apparatus further includes the memory. In an embodiment, the communication apparatus further includes a communication interface, and the processor is coupled to the communication interface.

When the communication apparatus is the terminal device, the communication interface may be a transceiver or an input/output interface.

When the communication apparatus is the chip disposed in the terminal device, the communication interface may be the input/output interface.

In an embodiment, the transceiver may be a transceiver circuit. In an embodiment, the input/output interface may be an input/output circuit.

According to an eleventh aspect, a communication apparatus is provided. The communication apparatus may be the network device in the foregoing method designs or a chip disposed in the network device. The communication apparatus includes a processor. The processor is coupled to a memory and may be configured to execute instructions in the memory, to implement the method performed by the network device according to any one of the second aspect or the possible implementations of the second aspect. In an embodiment, the communication apparatus further includes the memory. In an embodiment, the communication apparatus further includes a communication interface, and the processor is coupled to the communication interface.

When the communication apparatus is the network device, the communication interface may be a transceiver or an input/output interface.

When the communication apparatus is the chip disposed in the network device, the communication interface may be the input/output interface.

In an embodiment, the transceiver may be a transceiver circuit. In an embodiment, the input/output interface may be an input/output circuit.

According to a twelfth aspect, a computer program product is provided. The computer program product includes computer program code, and when the computer program code is run on a computer, the computer is enabled to perform the methods in the foregoing aspects.

According to a thirteenth aspect, a computer-readable medium is provided. The computer-readable medium stores program code, and when the computer program code is run on a computer, the computer is enabled to perform the methods in the foregoing aspects.

8

DESCRIPTION OF EMBODIMENTS

The following describes the technical solutions in this application with reference to the accompanying drawings.

The technical solutions in this embodiment of this application may be applied to various communication systems, for example, a long term evolution (LTE) system, an LTE frequency division duplex (FDD) system, an LTE time division duplex (TDD) system, a fifth generation (5G)

mobile communication system or a new radio (NR) communication system, and a future mobile communication system.

Figure 1:
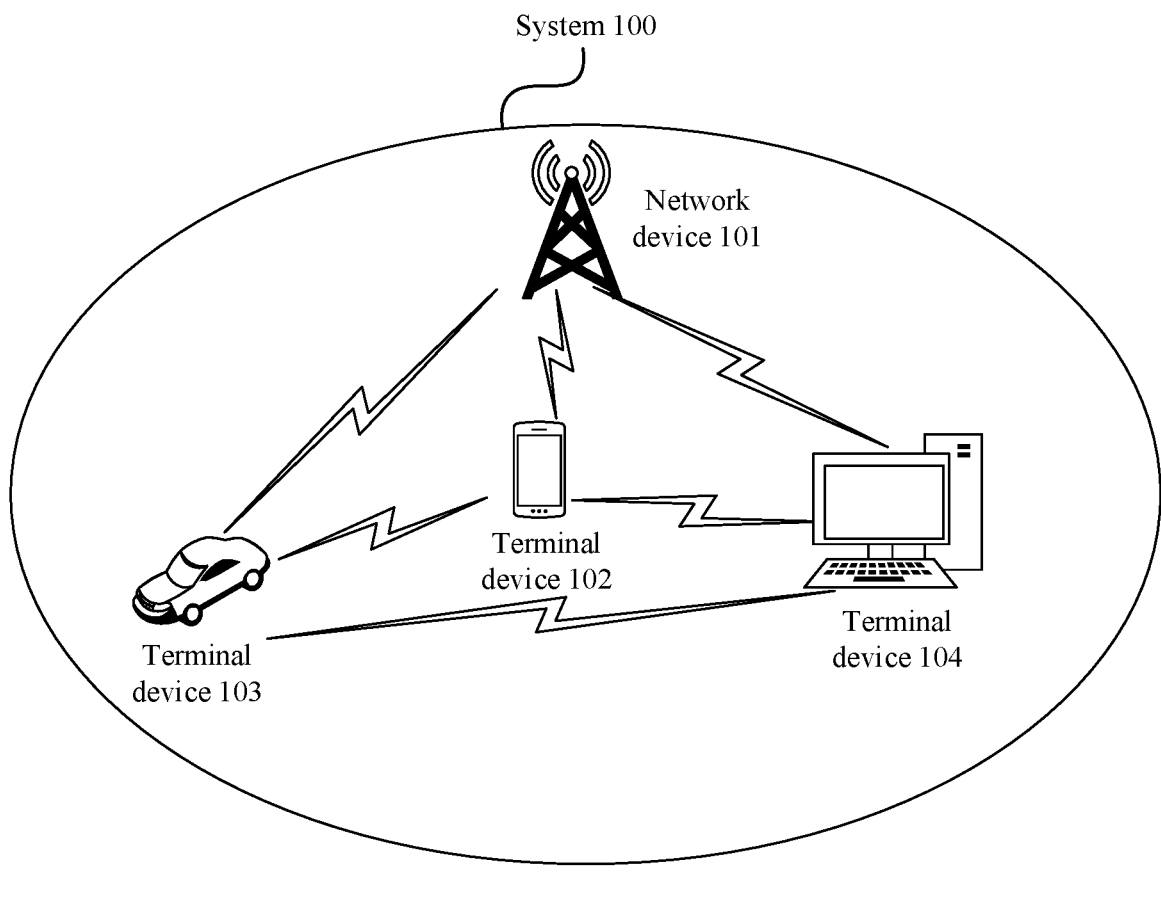
FIG. 1 is a schematic diagram of a wireless communication system applicable to an embodiment of this application.

FIG. 1 is a schematic diagram of a wireless communication system 100 applicable to an embodiment of this application. As shown in FIG. 1, the wireless communication system 100 may include one or more network devices, for example, a network device 101 shown in FIG. 1. The wireless communication system 100 may further include one or more terminal devices, for example, a terminal device 102, a terminal device 103, and a terminal device 104 shown in FIG. 1. It should be understood that FIG. 1 is merely a schematic diagram. The communication system may further include another network device, for example, a core network device, a wireless relay device, and a wireless backhaul device, which are not shown in FIG. 1. Quantities of network devices and terminal devices included in the mobile communication system are not limited in this embodiment of this application.

In the mobile communication system 100, the terminal device 102, the terminal device 103 and the terminal device 104 in this embodiment of this application may also be referred to as a terminal, user equipment (UE), a mobile station (MS), a mobile terminal (MT), or the like. The terminal device in this embodiment of this application may be a mobile phone (mobile phone), a tablet computer (Pad), a computer with a wireless transceiver function, or may be a wireless terminal device applied to a virtual reality (VR) scenario, an augmented reality (AR) scenario, an industrial control scenario, a self driving scenario, a remote medical scenario, a smart grid scenario, a transportation safety scenario, a smart city scenario, a smart home scenario, or the like. In this application, the foregoing terminal device and a chip that can be used in the foregoing terminal device are collectively referred to as a terminal device. It should be understood that a specific technology used by the terminal device and a specific device form are not limited in this embodiment of this application.

The network device 101 in this embodiment of this application may be a device configured to communicate with the terminal device. The network device may be a base station, an evolved NodeB (eNB), a home base station, an access point (AP) in a wireless fidelity (WIFI) system, a wireless relay node, a wireless backhaul node, a transmission point (TP), a transmission and reception point (TRP), or the like. The network device may further be a gNB in an NR system, or may be a component that forms the base station or a part of a device that forms the base station, for example, a central unit (CU), a distributed unit (DU), or a baseband unit (BBU). It should be understood that the specific technology used by the network device and the specific device form are not limited in this embodiment of this application. In this application, the network device may be the network device itself, or may be a chip used in the network device to complete a wireless communication processing function.

It should be understood that, in this embodiment of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). An operating system may be any one or more computer operating systems that implement service processing through a process, for example, a Linux operating system, a UNIX operating system, an Android operating system, an iOS operating system, or a Windows operating system. The application layer includes applications such as a browser, an address book, word processing software, and instant messaging software. In addition, a specific structure of an entity for performing a method provided in this embodiment of this application is not particularly limited in this embodiment of this application, provided that the entity can run a program that records code of the method provided in this embodiment of this application to perform communication according to the method provided in this embodiment of this application. For example, the entity for performing the method provided in this embodiment of this application may be the terminal device, the network device, or a functional module that is in the terminal device or the network device and that can invoke and execute the program.

It should be further understood that a channel determining method provided in this embodiment of this application may be applied to a communication process between the terminal device and the network device, for example, an uplink communication process between the terminal device 102, the terminal device 103, the terminal device 104, and the base station 101. The channel determining method may be further applied to communication between the terminal device 102, the terminal device 103, and the terminal device 104, for example, a communication process of a sidelink, and a communication process between the terminal device 102 and the terminal device 103 in a vehicle to everything (V2X) information exchange service. This is not limited in this application. In the following embodiments, an uplink communication process between the terminal device and the base station is used as an example to specifically describe the channel determining method in this application.

In addition, aspects or features of this application may be implemented as a method, an apparatus, or a product that uses standard programming and/or engineering technologies. The term "product" used in this application covers a computer program that can be accessed from any computer-readable device, carrier or medium. For example, the computer-readable medium may include but is not limited to: a magnetic storage component (for example, a hard disk, a floppy disk, or a magnetic tape), an optical disc (for example, a compact disc (CD)) and a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to and various other media that can store, include, and/or carry instructions and/or data.

It should be understood that manner division, case division, type division, and embodiment division in the embodiments of this application are merely for ease of description, but should not constitute any special limitation, and features in various manners, types, cases, and embodiments may be combined when there is no contradiction.

It should be further understood that the terms "first", "second", and "third" in the embodiments of this application are merely used for distinguishing, and should not be construed as any limitation on this application. For example, "first channel" and "second channel" in the embodiments of this application indicate resources for transmitting information between the base station and the terminal device.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further noted that, in the embodiments of this application, "preset", "predefined", and the like may be implemented by corresponding code, a table, or another manner that may be used to indicate related information pre-stored in a device (for example, including a terminal device and a network device). A specific implementation is not limited in this application, for example, a preset rule or a preset constant in the embodiments of this application.

It should be noted that the term "and/or" describes an association relationship for describing associated objects and represents that three relationships may exist. For example, A and/or B may represent the following three cases: Only A exists, both A and B exist, and only B exists. A character "/" usually indicates an "or" relationship between the associated objects. The technical solutions provided in this application are described in detail below with reference to the accompanying drawings.

To facilitate understanding of the embodiments of this application, the following briefly describes several concepts in this application.

1. Timeslot and Time Domain Symbol

The timeslot may be understood as a part of serial self-multiplexing of timeslot information dedicated to a single channel. The timeslot may be understood as a channel.

In the embodiments of this application, a symbol is also referred to as the time domain symbol, and may be an orthogonal frequency division multiplexing (OFDM) symbol or a single carrier frequency division multiple access (SC-FDMA) symbol. The SC-FDMA is also referred to as orthogonal frequency division multiplexing with transform precoding (OFDM with TP).

In addition, the time domain symbol may also be understood as a time unit. For example, one time unit may be one or more subframes, one or more timeslots, or, one or more symbols. When one time unit is one symbol, the time domain symbol and the time unit may be equivalent in descriptions of the embodiments of this application.

2. Physical uplink channel

The physical uplink channel is a channel that may be used to carry uplink control information and/or uplink data. For example, the physical uplink channel may include a physical uplink control channel (PUCCH) and a physical uplink shared channel (PUSCH) that are defined in an LTE protocol or an NR protocol, and may include other uplink channels that have the foregoing functions as defined as a network evolves.

3. Downlink control information (DCI)

The downlink control information is mainly used to send downlink scheduling allocation information, and has a plurality of different formats, including but not limited to DCI formats 0-0, 0-1, 1-0, 1-1, 2-0,2-1,2-2, and 2-3.

4. PUCCH resource indicator field (PUCCH resource indicator field)

An M-bit (bit) information field in the DCI is used to indicate an available transmission resource for HARQ-ACK information. In an embodiment, M is equal to 3.

The following describes in detail uplink control information (UCI) of a transmission object in the embodiments of this application.

In the embodiments of this application, the uplink control information UCI includes at least one of a hybrid automatic repeat request acknowledgement (HARQ-ACK), a scheduling request (SR), and CSI (CQI, PMI, and RI).

4. Physical sidelink control channel (PSCCH)

The PSCCH may be used to carry sidelink control information, sidelink feedback control information, and/or the like.

5. Physical sidelink shared channel (PSSCH)

The PSSCH may be used to send sidelink data and the like.

6. Physical sidelink feedback channel (PSFCH)

The PSFCH may be used to carry sidelink feedback control information, for example, HARQ information used to feed back the sidelink data.

By way of example and not limitation, in the embodiments of this application, the uplink control information may include but is not limited to one or more of the following information:

1. Feedback information

In the embodiments of this application, the uplink control information may include feedback information for downlink data.

Specifically, in the embodiments of this application, a feedback technology may be used for downlink data transmission. By way of example and not limitation, the feedback technology may include, for example, a hybrid automatic repeat request (HARQ) technology.

The HARQ technology is a technology formed by combining forward error correction (FEC) coding and an automatic repeat request (ARQ).

For example, in the HARQ technology, after a receive end receives data from a transmit end, whether the data can be correctly decoded is determined. If the data cannot be correctly decoded, the receive end may feed back negative acknowledgment (NACK) information to the transmit end, so that the transmit end may determine, based on the NACK information, that the receive end does not correctly receive the data, and the transmit end may perform retransmission. If the data can be correctly decoded, the receive end may feed back acknowledgment (ACK) information to the transmit end, so that the transmit end may determine, based on the ACK information, that the receive end correctly receives the data, and the transmit end may determine that data transmission is completed.

In other words, in the embodiments of this application, when the receive end successfully decodes the data, the receive end may feed back the ACK information to the transmit end. When the receive end fails to decode the data, the receive end may feed back the NACK information to the transmit end.

By way of example and not limitation, in the embodiments of this application, the uplink control information may include the ACK information or the NACK information in the HARQ technology. The HARQ-ACK is used to feed back a receiving status of a downlink data channel PDSCH. When the UE correctly receives the PDSCH, the UE sends an ACK. When the UE incorrectly receives the PDSCH, the UE sends a NACK. The base station determines, based on feedback information of the UE for the PDSCH channel, a subsequent scheduling policy, for example, whether to retransmit or newly transmit a PDSCH.

By way of example and not limitation, in the embodiments of this application, the sidelink feedback control information may include the ACK information or the NACK information in the HARQ technology. The HARQ-ACK is used to feed back a receiving status of a physical sidelink data channel PSSCH. When transmitting UE sends the PSSCH to receiving UE and the receiving UE correctly receives the PSSCH, the receiving UE sends an ACK. When the receiving UE incorrectly receives the PSSCH, the receiving UE sends a NACK. The base station, the transmitting UE, or third UE determines, based on receiving feedback information of the UE for the PSSCH, a subsequent scheduling policy, for example, whether to retransmit or newly transmit a PSSCH. In descriptions of the embodiments of this application, the HARQ-ACK is often used as feedback information in the HARQ technology. It should be understood that the HARQ-NACK information may alternatively be the feedback information in the HARQ technology. This is also applicable to this application.

It should be understood that the content included in the feedback information described above is merely an example, and this application is not limited thereto. Other information that can indicate a receiving status of the downlink data by the terminal device shall fall within the protection scope of this application. For example, the feedback information may further include discontinuous transmission (DTX) information, where the DTX information may be used to indicate that the terminal device receives no downlink data.

2. Channel state information (CSI)

In the wireless communication field, the CSI is a channel attribute of a communication link. The CSI is channel state information fed back to the base station or another UE after the UE measures a channel state. The information further includes information such as the CQI, the PMI, and the RI. The CSI describes signal attenuation on each transmission path, that is, a value of each element in a channel gain matrix H, such as signal scattering, environment fading (multipath fading or shadowing fading), or power decay of distance. The CSI enables a communication system to adapt to a current channel condition and ensures high-reliability and high-rate communication in a multi-antenna system.

3. Channel quality indicator (CQI) information

In the embodiments of this application, the CQI may be used to reflect channel quality of the physical downlink shared channel (PDSCH) and the PSSCH. The CQI is channel quality indication information used to directly report channel quality. The base station may further determine, based on the CQI, a modulation and coding scheme (MCS) for sending data. When a value of the fed back CQI is large, a high coding and modulation scheme and a high bit rate may be used, so that more information may be carried on a limited resource. This can improve a data transmission rate. When the value of the fed back CQI is small, a low modulation and coding scheme and a low bit rate may be used, so that more time-frequency resources are used to transmit the data. This can improve data transmission reliability. In addition, the UE measures CQIs of different frequency domain resources, so that the base station can schedule the data on a frequency domain resource with good channel quality. This can obtain scheduling gains in frequency domain.

By way of example and not limitation, in the embodiments of this application, 0 to 15 may be used to indicate the channel quality of the PDSCH. 0 indicates poorest channel quality, and 15 indicates best channel quality.

In the embodiments of this application, the terminal device may send the CQI information to the network device on the PUCCH or the physical uplink shared channel (PUSCH). Alternatively, the terminal device may send the CQI information to another terminal device on the PSSCH or the PSCCH. The network device or the another terminal device may determine the current radio channel condition of the PDSCH or the PUSCH based on the CQI information, and further complete scheduling of the PDSCH. For example, in the embodiments of this application, the network device may determine, based on the CQI information, adaptive modulation and coding (AMC), the modulation and coding scheme (MCS), a bit rate or a data amount of uplink transmission or downlink transmission, and the link.

4. Rank indicator (RI) information

In the embodiments of this application, the RI is the rank indicator information used to feed back, to the base station, a quantity of layers that can be separated from the channel. A larger quantity of layers indicates a larger amount of data that can be transmitted at the same time. The RI information may be used to indicate a quantity of valid data layers of the PDSCH or the PSSCH, or the RI information may be used to indicate a quantity of code words (CW) currently supported by the terminal device.

5. Precoding matrix indicator (PMI) information

In the embodiments of this application, the PMI information may be used to indicate an index of a codebook set, and the PMI is a precoding matrix identifier of sending data that the UE feeds back to the base station or the another UE based on measured channel quality. The base station or the another UE may determine a corresponding precoding matrix based on the fed back PMI information. To be specific, when a multi-antenna technology, for example, a multiple-input multiple-output (MIMO) technology is used, precoding may be performed based on a precoding matrix during baseband processing. The terminal device may indicate the precoding matrix by using the PMI information. This can improve signal quality of the PDSCH.

In addition, some information, such as CSI-RS resource indicator (CRI) information, is used to feed back, to the base station, a measurement resource with best channel measurement quality in a plurality of measured measurement resources.

It should be understood that, the specific content of the CSI enumerated above is merely an example, and shall not constitute any limitation on this application. The CSI sent by a receive device to a transmit device may include one or more of the foregoing contents, or may also include information, other than the foregoing contents, used to indicate the CSI. This is not limited in this application.

In the embodiments of this application, sending the uplink control information may be sending data or information carried on the uplink control channel PUCCH or the uplink shared channel PUSCH. The data or the information may be data or information obtained after channel coding is performed. This is not limited in this application.

Similarly, in the embodiments of this application, sending the downlink control information may be sending data or information carried on a downlink control channel PDCCH or a downlink shared channel PDSCH. The data or the information may be data or information obtained after channel coding is performed. This is not limited in this application.

Similarly, in the embodiments of this application, sending the sidelink control information may be sending data or information carried on the sidelink control channel PSCCH or the sidelink shared channel PSSCH. The data or the information may be data or information obtained after channel coding is performed. This is not limited in this application.

Generally, the embodiments of this application are described in detail below by using an interaction process between one terminal device and one base station as an example. This application further includes a communication process of a sidelink between the terminal devices, for example, a communication process of a sidelink, and a communication process in a vehicle to everything (V2X) information exchange service. This is not limited in this application. The interaction process between the terminal device and the base station is used as an example. The terminal device may be any terminal device in a wireless communication system that has a wireless connection relationship with one or more network devices. It may be understood that the any terminal device in the wireless communication system may implement wireless communication according to a same technical solution. This is not limited in this application.

As described in the background part, to avoid a conflict caused by sending channels at the same time, the base station is required to avoid a conflict between different channels as much as possible during scheduling. In addition, when the conflict cannot be avoided, a corresponding rule is defined to determine which channel needs to be used to send information, so that an agreement is reached between the base station and the terminal device. A current problem that needs to be resolved is how to ensure consistency between the base station and the terminal device in a resource determining process. This further meets a sending requirement of the terminal device and improves reliability of uplink transmission.

When the different channels occupy at least a same time unit (subframe, timeslot, and symbol) in time domain, it may be considered that the different channels overlap in time domain, and it is considered that the conflict exists. Conflict processing rules may be roughly divided into two types: One processing method is to drop a channel. Specifically, when different channels conflict, information is not sent on one channel or a plurality of channels, and is sent only on one of conflicting channels. Another processing method is reusing a channel. Specifically, information carried on one channel is not sent on the channel, but is sent on another channel that conflicts with the channel. Certainly, there is another channel selection manner to implement reusing. For example, one of conflicting channels is selected to send information based on a type and a state of the information carried by one channel or a plurality of channels. For example, when a PUCCH for sending a scheduling request (SR) conflicts with a PUCCH for sending a HARQ-ACK, if a state of the SR is positive, HARQ-ACK information is sent on a PUCCH on which the SR is located. If the state of the SR is negative, the HARQ-ACK is sent on a PUCCH on which the HARQ-ACK is located.

Figure 2:
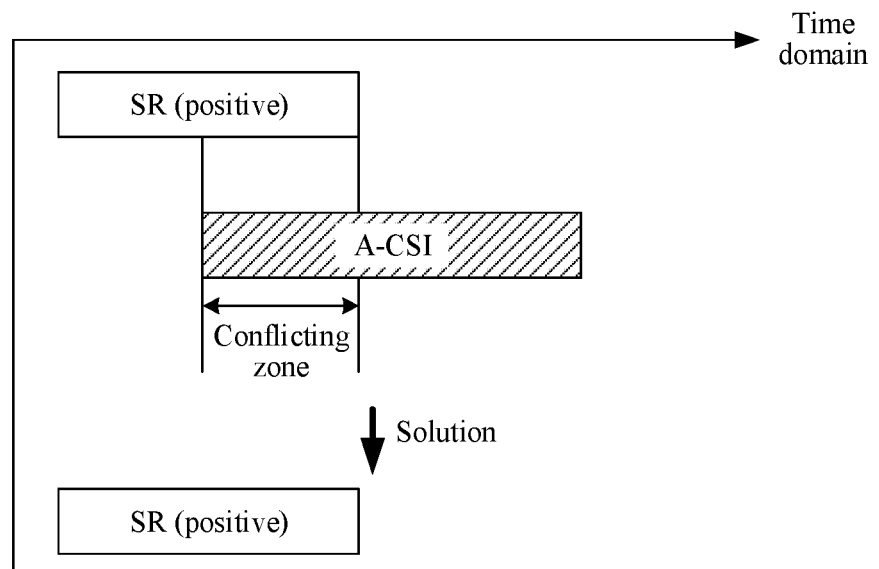
FIG. 2 is a schematic diagram of a resource selection process in a transmission process.

FIG. 2 is a schematic diagram of a resource selection process in a transmission process. As shown in FIG. 2, in time domain, a PUCCH that carries an SR conflicts with a PUSCH that carries aperiodic channel state information (A-CSI). When a state of the SR is positive, the PUSCH that carries the A-CSI may be discarded in a conflict resolution method. In other words, the channel shown in a shaded part in FIG. 2 may be discarded.

Figure 3:
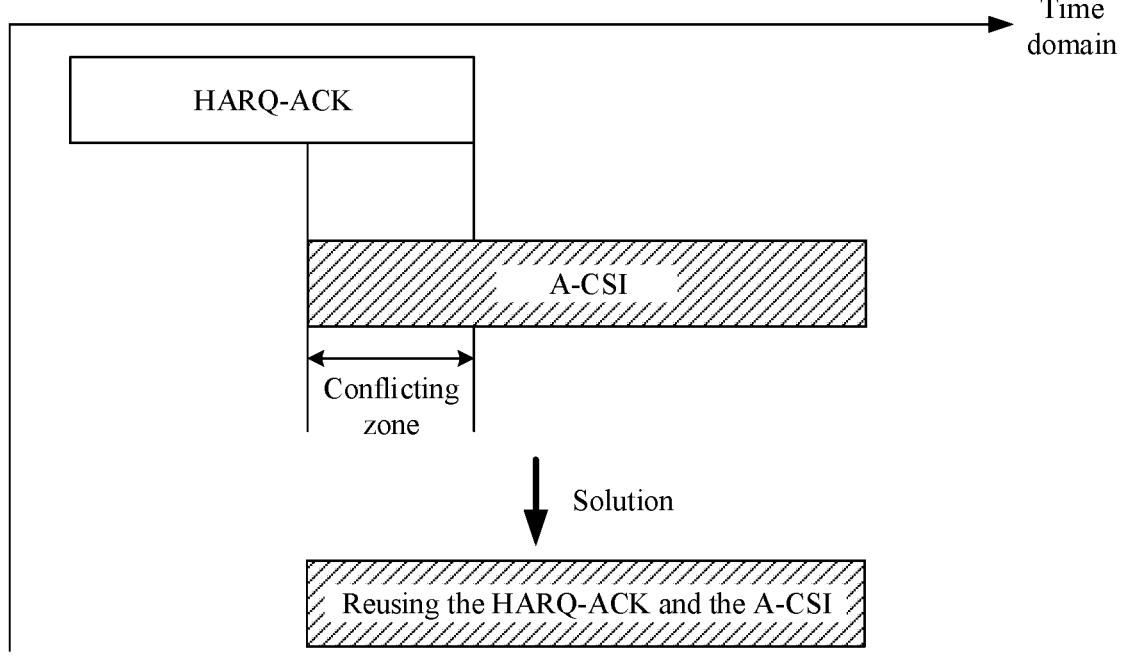
FIG. 3 is a schematic diagram of another resource selection process in a transmission process.

FIG. 3 is a schematic diagram of another resource selection process in a transmission process. As shown in FIG. 3, in time domain, a PUCCH that carries a HARQ-ACK conflicts with a PUSCH that carries A-CSI. In this case, the PUSCH that carries the A-CSI may be reused to send a HARQ.

The foregoing describes existing processing rules when two channels conflict. When two channels conflict, processing may be performed according to different rules. In addition to a case in which two channels conflict, in a possible case, a plurality of channels may also conflict at the same time. For example, one channel conflicts with at least two other channels at the same time, but the at least two other channels do not conflict. A channel conflict problem in this case is not resolved in a current solution.

Figure 4:
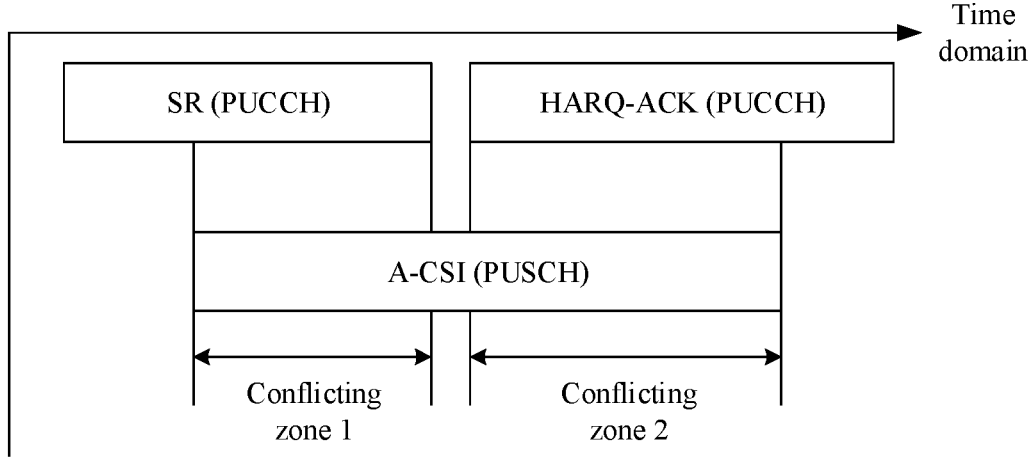
FIG. 4 is a schematic diagram of a resource conflict in another uplink transmission process according to an embodiment of this application.

FIG. 4 is a schematic diagram of a resource conflict in another uplink transmission process according to an embodiment of this application. As shown in FIG. 4, when a PUCCH that carries an SR and a PUCCH that carries a HARQ conflict with a PUSCH that carries A-CSI at the same time, but the PUCCH that carries the SR does not conflict with the PUCCH that carries the HARQ, how to handle a conflict between resources is an urgent problem to be resolved.

This application provides a channel determining method, to determine a resource used for transmission for a base station and a terminal device. This can improve transmission reliability. It should be understood that an example in which an uplink transmission process performed by the terminal device to the base station and an example in which the PUSCH that carries the A-CSI conflicts with a PUCCH that carries the SR, CSI, or HARQ-ACK, or a PUSCH that carries the SR, the CSI, or the HARQ-ACK are used to specifically describe the channel determining method in this application.

Figure 5:
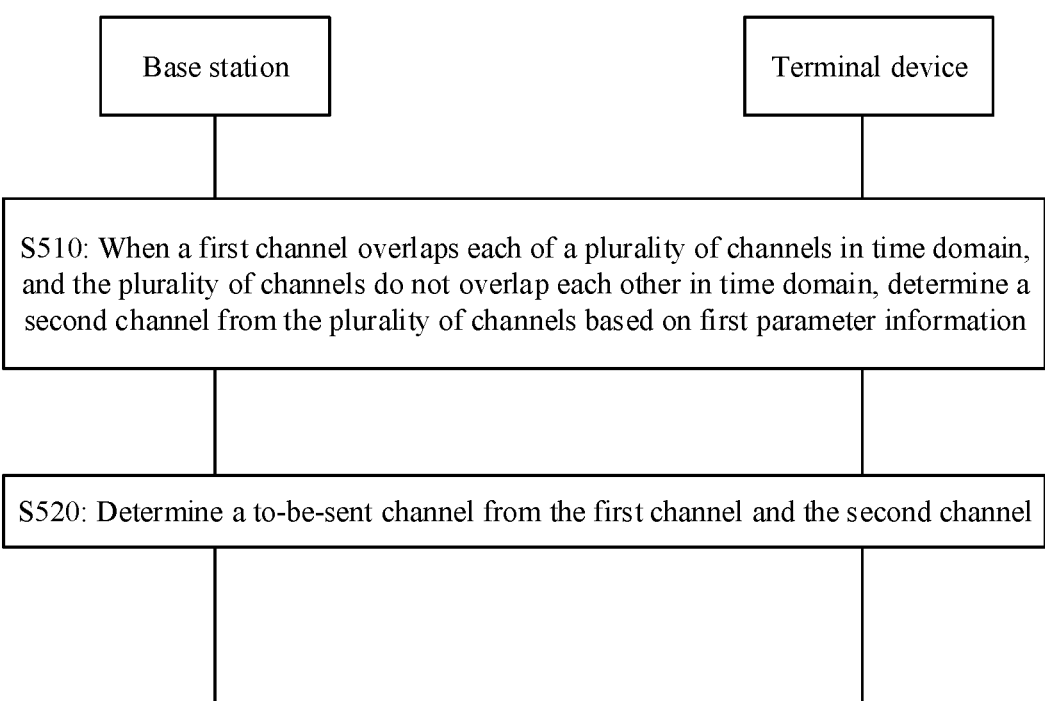
FIG. 5 is a schematic interaction diagram of a channel determining method according to an embodiment of this application.

FIG. 5 is a schematic interaction diagram of a channel determining method 500 according to an embodiment of this application. The method 500 may be applied to the terminal device or the base station in the foregoing wireless communication system 100. As shown in FIG. 5, the method 500 includes the following content.

S510: When a first channel overlaps each of a plurality of channels in time domain, and the plurality of channels do not overlap each other in time domain, determine a second channel from the plurality of channels based on first parameter information.

It should be understood that, in this application, the first channel may be a PUSCH, for example, a PUSCH that does not carry an uplink shared channel (UL-SCH), that is, a PUSCH that carries A-CSI or SP-CSI. Each of the plurality of channels may be the PUSCH and/or a PUCCH, for example, a PUSCH and/or a PUCCH that carry/carries an SR, CSI, or a HARQ. This is not limited in this application.

It should be further understood that the first channel in this application may be a PSSCH, for example, a PSSCH that carries A-CSI. The plurality of channels may be PSCCHs and/or PSFCHs. This is not limited in this application.

It should be further understood that, in this application, the plurality of channels include at least two channels. The plurality of channels do not overlap each other in time domain, that is, no conflict occurs. However, each of the plurality of channels overlaps the first channel in time domain, that is, a conflict occurs.

For example, in the schematic diagram shown in FIG. 4, the PUCCH that carries the SR and the PUCCH carries the HARQ conflict with the PUSCH that carries the A-CSI at the same time, but the PUCCH that carries the SR does not conflict with the PUCCH that carries the HARQ. In this case, the PUCCH that carries the SR and the PUCCH that carries the HARQ may be understood as two channels of the plurality of channels in this application, and the PUSCH that carries the A-CSI may be understood as the first channel in this application. A quantity of channels included in the plurality of channels is not limited in this application.

S520: Determine a to-be-sent channel from the first channel and the second channel.

A terminal device and a base station may determine the second channel from the plurality of channels based on the first parameter information. It may be understood that the terminal device and the base station select one channel from the plurality of channels as the second channel, to first resolve a conflict between the first channel and the second channel. It should be understood that the second channel may be understood as a channel that is preferentially selected to resolve the conflict with the first channel.

It should be further understood that the "to-be-sent channel" herein may be referred to as a "to-be-received channel" on a base station side. The "to-be-sent channel" herein is not necessarily a channel finally sent by the terminal device to the base station. In an embodiment, after the conflict between the first channel and the second channel is resolved, if the first channel is reserved as the to-be-sent channel, the first channel still conflicts with another channel in the plurality of channels. In this application, the another channel continues to be selected from the plurality of channels and the conflict with the first channel continues to be resolved. Until there is no conflict, a last reserved channel is finally sent. Alternatively, after the conflict between the first channel and the second channel is resolved, if the second channel is reserved as the to-be-sent channel, the second channel does not conflict with another channel in the plurality of channels. The second channel is the to-be-sent channel herein and the terminal device sends the second channel to the base station. This is not limited in this application.

It should be further understood that the first parameter information may be understood as a parameter used to select a channel from the plurality of channels. In other words, the terminal device and the base station may set a channel conflict resolution sequence based on the first parameter information, select the second channel based on the first parameter, to first resolve the conflict between the first channel and the second channel. If a similar conflict occurs later, the method in this application is repeated until a conflict is resolved.

The following describes, based on different types of the first parameter information, a process in which the terminal device and the base station determine, from the plurality of channels, the second channel to preferentially resolve the conflict. The methods are as follows.

Method 1

In a possible implementation, the first parameter information includes information about a start time unit for sending each of the plurality of channels, and an index of a time unit for sending the second channel is smallest among indexes of time units of the plurality of channels.

To facilitate the terminal device to implement the method, it may be specified that processing is performed in a time sequence. Specifically, processing may be performed in a channel sending sequence.

It should be understood that a 5G mobile communication system supports a plurality of subcarrier spacings. Each subcarrier spacing is applicable to different service types or operating frequencies, and symbols of different subcarrier spacings correspond to different cyclic prefix (CP) lengths. Currently, different subcarrier spacings in a carrier resource include 15 KHz, 30 KHz, 60 KHz, 120 KHz, and 240 KHz. Different serving cells have the same or different subcarrier spacings, so that transmission resources have same or different timeslot lengths.

Figure 6:
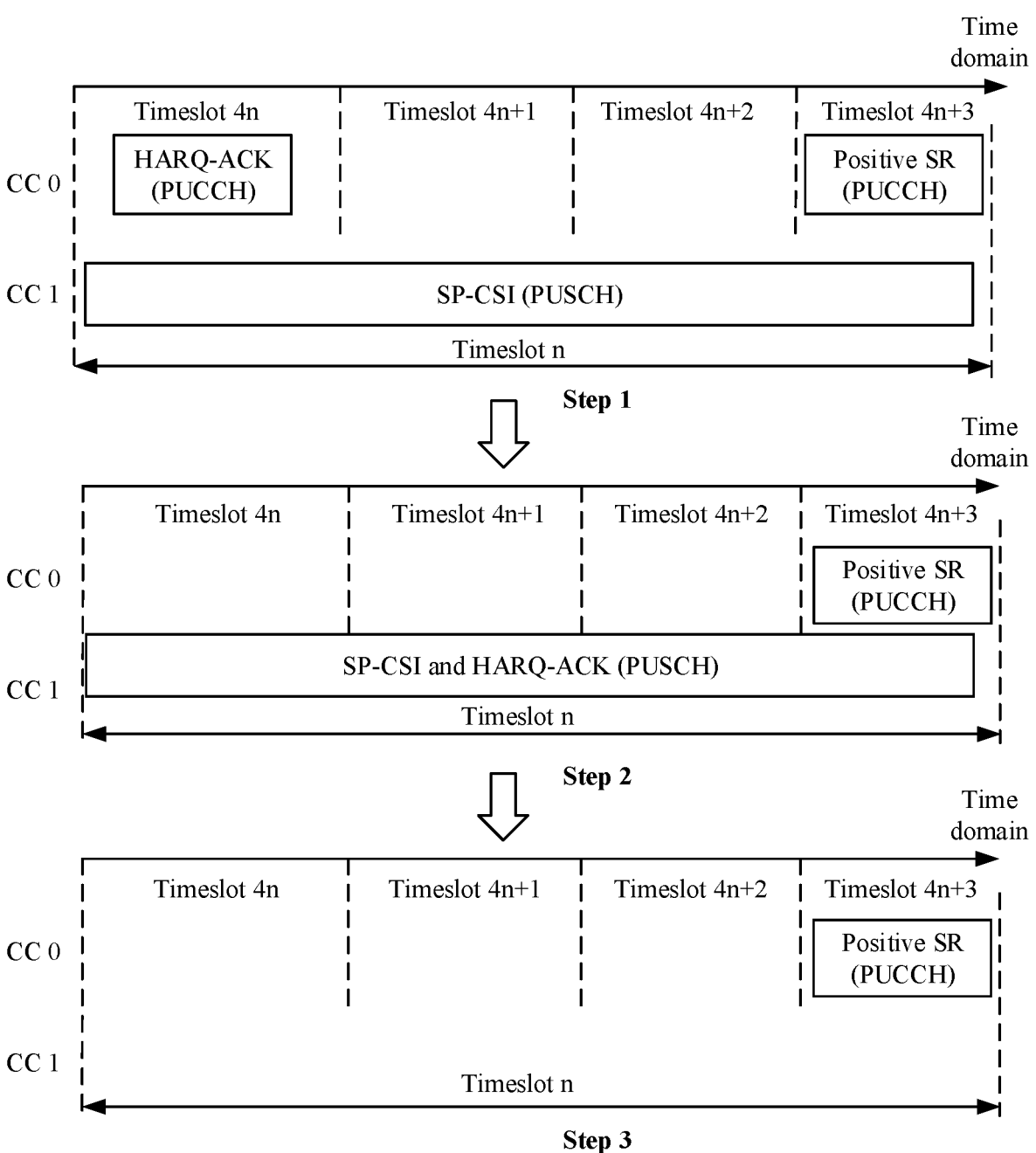
FIG. 6 is a schematic diagram of another resource determining process according to an embodiment of this application.

FIG. 6 is a schematic diagram of another resource determining process according to an embodiment of this application. For different component carriers (CC) in FIG. 6, a subcarrier spacing of CC 0 is 60 KHz, and a subcarrier spacing of CC 1 is 15 KHz. In the following drawings and descriptions of this application, the CC 0 and the CC 1 are used to indicate different carriers and each corresponds to different timeslots. For example, within a time length, the CC 0 corresponds to a timeslot 4n, a timeslot 4n+1, a timeslot 4n+2, and a timeslot 4n+3, and the CC 0 corresponds to a timeslot n.

For example, as shown in FIG. 6, for the CC 0, a PUCCH that carries a HARQ-ACK is included in the timeslot 4n, and a PUCCH that carries an SR (positive) is included in the timeslot 4n+3. For the CC 1, a PUSCH that carries SP-CSI is included in the timeslot n. The PUSCH that carries the SP-CSI conflicts with the PUCCH that carries the HARQ-ACK and the PUCCH that carries the SR (positive).

According to method 1, the first parameter information includes information about a start time unit corresponding to sending time of the PUCCH that carries the HARQ-ACK and the PUCCH that carries the SR (positive), and an index of a time unit corresponding to the sending time of the PUCCH that carries the HARQ-ACK is less than an index of a time unit corresponding to the sending time of the PUCCH that carries the SR (positive). In other words, start sending time of the PUCCH that carries the HARQ-ACK is earlier than start sending time of the PUCCH that carries the SR (positive). Therefore, the terminal device and the base station may use the PUCCH that carries the HARQ-ACK as the second channel and preferentially process a conflict between the PUCCH that carries the HARQ-ACK and the PUSCH (the first channel) that carries the SP-CSI.

As shown in operation 2 in FIG. 6, the conflict between the PUCCH that carries the HARQ-ACK and the PUSCH (the first channel) that carries the SP-CSI may be resolved according to the process shown in FIG. 3. To be specific, the PUSCH that carries the SP-CSI is reused to send the HARQ-ACK and the PUSCH, namely, the first channel, is reserved as the determined to-be-sent channel.

As shown in operation 3 in FIG. 6, a PUSCH that carries the HARQ-ACK and the SP-CSI and the PUCCH that carries the SR (positive) in the timeslot 4n+3 still conflict. Therefore, a conflict between the PUSCH that carries the HARQ-ACK and the SP-CSI and the PUCCH that carries the SR (positive) in the timeslot 4n+3 is then resolved. According to the process shown in FIG. 2, that is, the PUSCH that carries the HARQ-ACK and the SP-CSI is discarded, the PUCCH that carries the SR (positive) is reserved, and the PUCCH that carries the SR (positive) is used as the determined to-be-sent channel and information may be sent by the terminal device to the base station.

According to the foregoing solution, the base station and the terminal device may determine a channel conflict resolution sequence based on a time unit corresponding to a sending time domain position of a conflicting channel. In other words, a conflict of a channel whose sending time is earlier is preferentially processed. The channel determining method may retain and send as much control information as possible. This can improve reliability of transmission between the base station and the terminal device or between terminal devices.

It should be understood that the foregoing describes the channel determining method only by using the PUSCH as the first channel as an example. The method is also applicable to a sidelink communication process between terminal devices in which a PSSCH is used as the first channel and PSCCHs or PSFCHs are used as a plurality of channels. Details are not described herein again. Similarly, all the following methods are also applicable to the communication process between the terminal devices, and details are not described again.

Method 2

In a possible implementation, the first parameter information includes information about a start symbol of each of the plurality of channels, and an index of a start symbol of the second channel is smallest among indexes of start symbols of the plurality of channels.

It should be understood that, in addition to determining, in the plurality of channels, that a channel whose start time is earlier is the second channel to preferentially resolve a conflict problem with the first channel, which is described in the method 1, however, in the plurality of channels, if sending time of at least two channels corresponds to a same time unit or time unit indexes of the at least two channels are the same, the second channel may be determined based on a start symbol of a channel. For example, a channel whose start symbol is earlier is determined as the second channel. In other words, a channel with a smallest start symbol index is determined as the second channel. This is not limited in this application.

It should be further understood that, in this application, sending time of the channel is a start time of sending each channel, and similarly receiving time of the channel is start time of receiving each channel.

It should be further understood that the method for determining the second channel by using the start symbol may also be used independently, that is, a conflict problem between which channel and the first channel is preferentially processed based on a start symbol of each channel. Alternatively, when it is impossible to determine the conflict problem between which channel and the first channel is preferentially processed based on a time unit for sending the channel described in the method 1, the conflict problem between which channel and the first channel is further determined to be preferentially processed based on the start symbol of the channel. This is not limited in this application.

In an embodiment, channels having a same start symbol as the first channel may be determined as the second channel, or a conflict problem between any two channels in the channels having the same start symbol is preferentially processed. This is not limited in this application.

According to the foregoing solution, the base station and the terminal device may determine a channel conflict resolution sequence based on a start symbol of a conflicting channel. In other words, a conflict of the channel whose start symbol is earlier is preferentially processed. The channel determining method may retain and send as much the control information as possible. This can improve reliability of transmission between the base station and the terminal device or between terminal devices.

Method 3

In a possible implementation, the first parameter information includes information about start time units for receiving a plurality of pieces of signaling, and an index of a time unit used to indicate signaling of the second channel is smallest among indexes of time units of the plurality of pieces of signaling.

It should be understood that, before a channel conflict is resolved, for uplink transmission, the terminal device may receive the plurality of pieces of signaling sent by the base station. The plurality of pieces of signaling are used to indicate a time unit for sending the plurality of channels. For example, signaling may be scheduling instructions, for example, DCI, higher-layer signaling, radio resource control (RRC) signaling, or PHCP layer signaling. This is not limited in this application.

Specifically, the second channel may be selected from the plurality of channels based on a sequence of sending scheduling signaling by a network device, to preferentially process a conflict. In other words, a conflict between a first-scheduled channel and the first channel is preferentially processed.

In a possible implementation, if there are a plurality of semi-persistently scheduled channels, a conflict between semi-persistent channels is first processed. If more than two semi-persistently scheduled channels conflict, processing may be preferentially performed according to a method in method 1 and method 2.

Figure 7:
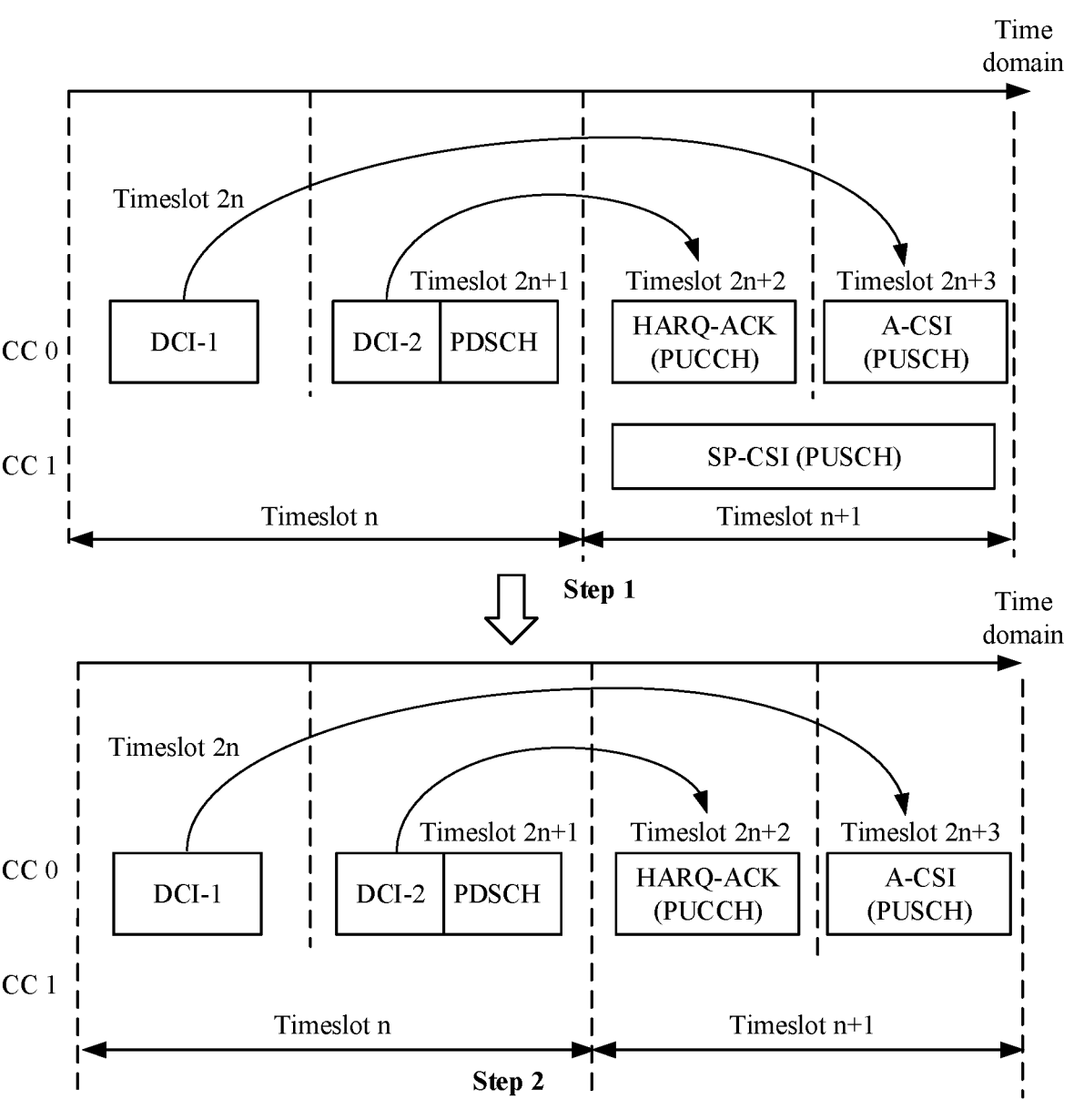
FIG. 7 is a schematic diagram of another resource determining process according to an embodiment of this application.

FIG. 7 is a schematic diagram of another resource determining process according to an embodiment of this application. For example, as shown in FIG. 7, for a CC 0, the base station delivers DCI-1 in a timeslot 2n to indicate the terminal device to send a PUCCH carrying a HARQ-ACK in a timeslot 2n+1. The base station schedules a downlink data PDSCH in the timeslot 2n+1 and delivers DCI-2 to indicate the terminal device to send a PUSCH carrying A-CSI report in a timeslot 2n+3. For a CC 1, a PUSCH that carries SP-CSI is included in a timeslot n+1. The PUSCH that carries the SP-CSI conflicts with the PUCCH that carries the HARQ-ACK and a PUSCH that carries A-CSI. In this case, it may be understood that scheduling of the A-CSI is earlier than scheduling of the HARQ-ACK, although sending of the A-CSI report is later than sending of the HARQ-ACK. In this case, a conflict between a PUSCH that is first scheduled and that is used to carry the A-CSI and the PUSCH that carries the SP-CSI should be preferentially processed.

According to the foregoing solution, the base station and the terminal device may determine a channel conflict resolution sequence based on start receiving time of scheduling signaling of a conflicting channel. In other words, a conflict of a channel that is scheduled earlier is preferentially processed. The channel determining method may retain and send as much control information as possible. This can improve reliability of transmission between the base station and the terminal device or between terminal devices.

Method 4

In a possible implementation, the first parameter information includes information about a different service type carried on each of the plurality of channels.

A 5G communication system supports services such as an enhanced mobile broadband (eMBB) service, an ultra-reliable low-latency communication (URLLC) service, a massive machine type communication (mMTC) service, and a vehicle to everything (V2X) information exchange service. When the terminal device reports information about different service types, channels that carry the information about different service types may also conflict. In this case, a conflict resolution sequence between terminal devices may be determined based on a service type.

Specifically, processing may be performed in the following sequence: A conflict between channels that carry information about a same service type is preferentially processed, and then a conflict between the channels that carry the information about the different service types is processed.

In a possible implementation, when the channels that carry the information about the different service types are processed, processing is performed according to a specific service type priority. For example, the URLLC service and/or the V2X service are preferentially processed, then the eMBB service is processed, and finally the mMTC service is processed.

Figure 8:
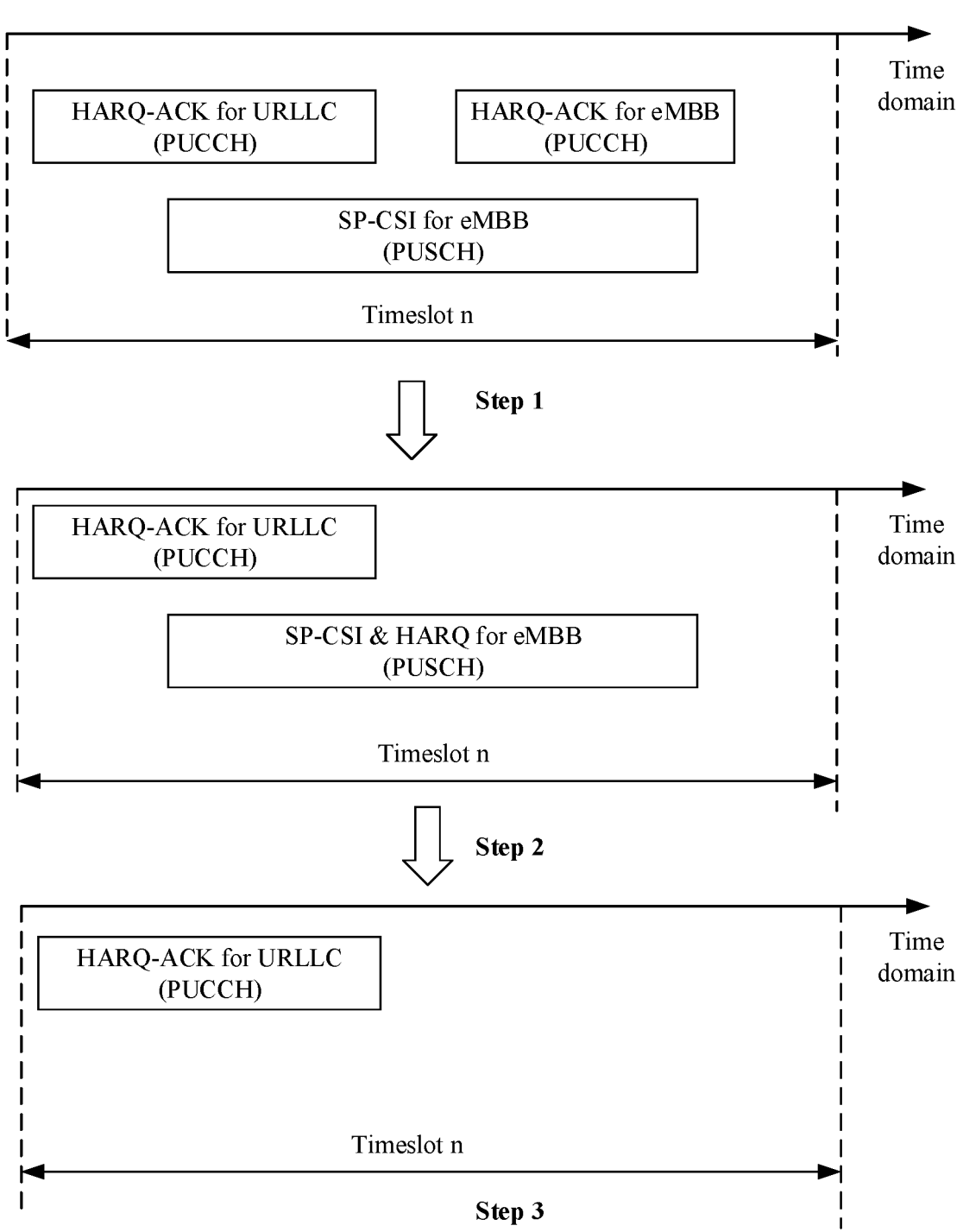
FIG. 8 is a schematic diagram of another resource determining process according to an embodiment of this application.

FIG. 8 is a schematic diagram of another resource determining process according to an embodiment of this application. For example, as shown in FIG. 8, when a PUCCH that carries a HARQ-ACK for a URLLC service and a PUCCH that carries a HARQ-ACK for an eMBB service conflict with a PUSCH that carries SP-CSI for the eMBB service at the same time, a conflict between eMBB services is preferentially processed. As shown in operation 2 in FIG. 8, in a conflict resolution process between the PUCCH that carries the HARQ-ACK for the eMBB service and the PUSCH that carries the SP-CSI for the eMBB service, a PUSCH is reused to send the HARQ-ACK for the eMBB service and the SP-CSI for the eMBB service, and then a conflict between the eMBB and the URLLC is processed. It is assumed that the conflict between the URLLC and the eMBB causes a channel for the eMBB to be discarded. Therefore, as shown in operation 3 in FIG. 8, the PUSCH that carries the HARQ-ACK for the eMBB service and the SP-CSI for the eMBB service is discarded. Similarly, the URLLC service herein may also be a V2X service. This is not limited in this application.

In a possible implementation, the conflict between the URLLC service and the eMBB service may be preferentially processed, and then the conflict between a result in operation 1 and an mMTC service is processed.

Figure 9:
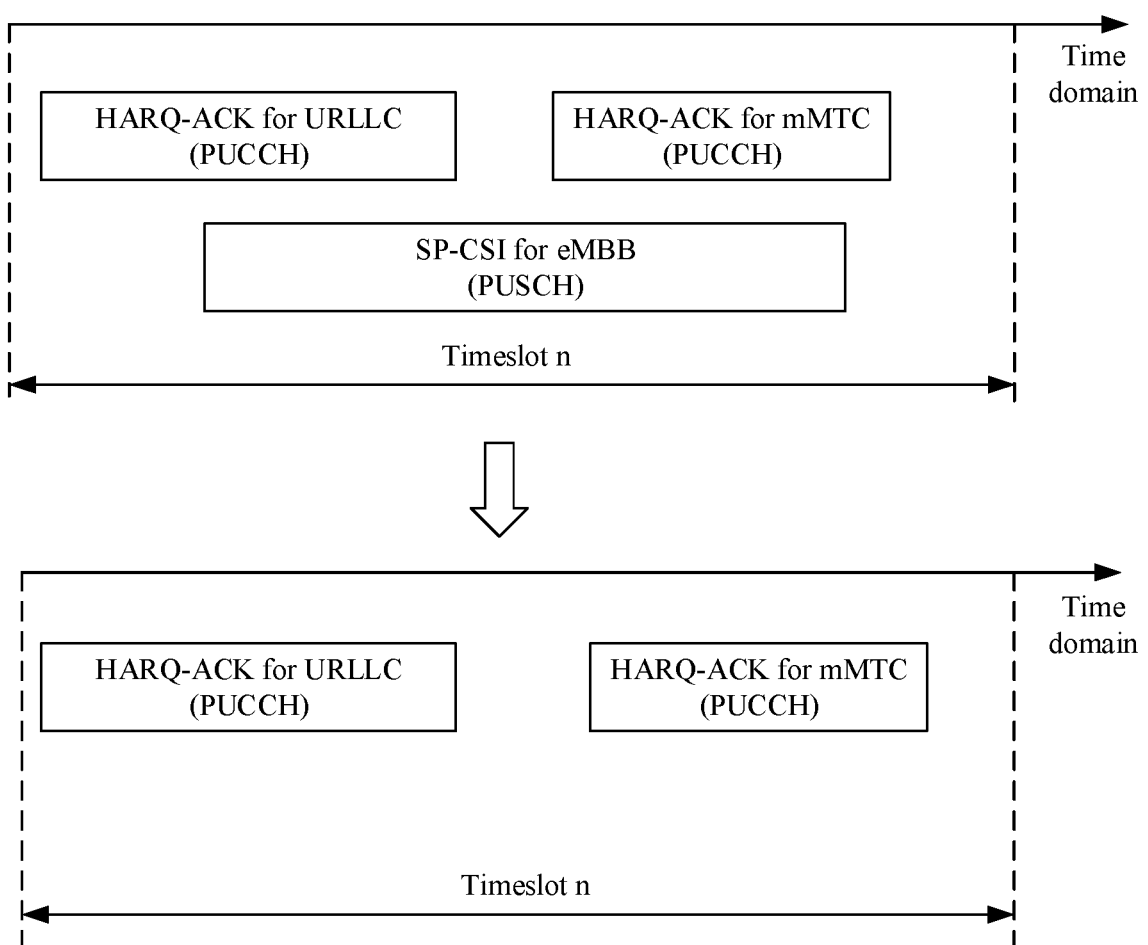
FIG. 9 is a schematic diagram of another resource determining process according to an embodiment of this application.

FIG. 9 is a schematic diagram of another resource determining process according to an embodiment of this application. For example, as shown in FIG. 9, when a PUCCH that carries a HARQ-ACK for a URLLC service and a PUCCH that carries a HARQ-ACK for an mMTC service conflict with a PUSCH that carries SP-CSI for an eMBB service at the same time, a conflict between the URLLC service and the eMBB service is preferentially processed. As shown in operation 2 in FIG. 9, the PUSCH that carries the SP-CSI for the eMBB service is discarded.

In a possible implementation, the first channel and the second channel carry a same service.

In other words, after determining the first channel, the base station and the terminal device determine, from the plurality of channels, a channel that carries the same service as the first channel based on a service type carried on the first channel and a same service type, and use the channel as the second channel. The base station and the terminal device preferentially process a conflict between the second channel and the first channel. For example, when the first channel is a PUSCH that carries the URLLC service, the plurality of channels include a PUCCH that carries the URLLC service, a PUCCH that carries the mMTC service, and a PUCCH that carries the eMBB service, and a conflict between the PUSCH that carries the URLLC services and the PUCCH that carries the URLLC service is preferentially processed.

According to the foregoing solution, the base station and the terminal device may determine a channel conflict resolution sequence based on a type of a service carried on a conflicting channel. In other words, a conflict of a channel that carries a higher-priority service is preferentially processed. The channel determining method may retain and send as much control information as possible. This can improve reliability of transmission between the base station and the terminal device or between terminal devices.

It should be understood that, in the process described in the foregoing embodiment, a PUSCH may be used as the first channel by default, for example, a PUSCH that carries A-CSI or the SP-CSI is used as the first channel. Each of the plurality of channels may be the PUSCH and/or a PUCCH, for example, a PUSCH and/or a PUCCH that carry/carries an SR, CSI, or a HARQ. In an actual communication process, the first channel may be a channel determined by the base station and the terminal device according to a specific rule.

In a possible implementation, the base station and the terminal device determine a channel that overlaps each of the plurality of channels in time domain as the first channel. In other words, when a channel conflicts with the plurality of channels at the same time, the channel is determined as the first channel. Then, the second channel is determined from the plurality of channels according to the method described in this application, so that the conflict between the first channel and the second channel is preferentially resolved.

Figure 10:
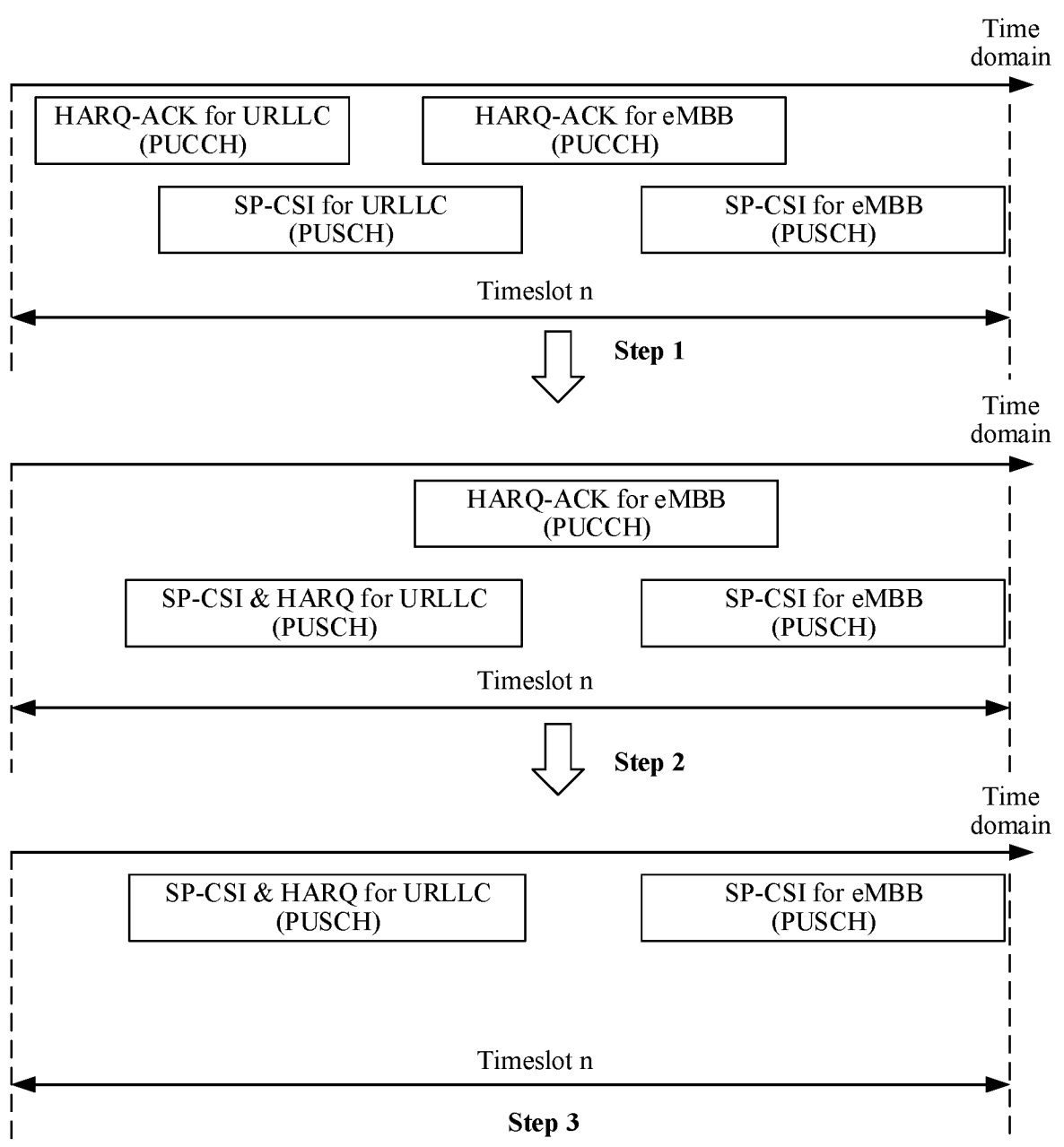
FIG. 10 is a schematic diagram of another resource determining process according to an embodiment of this application.

FIG. 10 is a schematic diagram of another resource determining process according to an embodiment of this application. For example, as shown in FIG. 10, a PUCCH that carries a HARQ-ACK for a URLLC service, a PUCCH that carries a HARQ-ACK for the eMBB service, a PUSCH that carries SP-CSI for the URLLC service, and a PUSCH that carries SP-CSI for the eMBB service conflict as shown in the following figure. In this conflict scenario, if the first channel is determined when one channel and a plurality of channels conflict at the same time, both the PUSCH that carries the SP-CSI for the URLLC service and the PUCCH that carries the HARQ-ACK for the eMBB service in FIG. 10 may be used as the first channel.

In an embodiment, the first channel may be determined according to priorities of services carried on different channels. For example, for the PUSCH that carries the SP-CSI for the URLLC service and the PUCCH that carries the HARQ-ACK for the eMBB service in FIG. 10, a priority of the URLLC service is higher than a priority of the eMBB service. Therefore, the PUSCH that carries the SP-CSI for the URLLC service is determined as the first channel.

Alternatively, the first channel may be determined based on start sending time of the different channels. For example, for the PUSCH that carries the SP-CSI for the URLLC service and the PUCCH that carries the HARQ-ACK for the eMBB service in FIG. 10, start sending time of the PUSCH that carries the SP-CSI for the URLLC service is earlier than start sending time of the PUCCH that carries the HARQ-ACK for the eMBB service. Therefore, the PUSCH that carries the SP-CSI for the URLLC service is determined as the first channel.

By way of example and not limitation, as shown in operation 2 in FIG. 10, the PUSCH that carries the SP-CSI for the URLLC service is determined as the first channel. A conflict between channels that carry the URLLC service is preferentially processed and a PUSCH is reused to send the HARQ-ACK for the URLLC service and the SP-CSI for the URLLC service. Then, the PUCCH that carries the HARQ-ACK for the eMBB service is discarded according to a rule of handling a conflict between the URLLC service and the eMBB service. A processing result shown in operation 3 is obtained in FIG. 10. This is not limited in this application.

In a possible implementation, the base station and the terminal device may separately resolve a conflict between channels that carry a same service based on a service type of a channel, and then resolve a channel conflict problem based on a plurality of solutions described in this application if there is still a conflict between one channel and the plurality of channels.

Figure 11:
FIG. 11 is a schematic diagram of another resource determining process according to an embodiment of this application.

FIG. 11 is a schematic diagram of another resource determining process according to an embodiment of this application. For example, as shown in FIG. 11, a PUCCH that carries a HARQ-ACK for a URLLC service, a PUCCH that carries a HARQ-ACK for an eMBB service, a PUSCH that carries SP-CSI for the URLLC service, and a PUSCH that carries SP-CSI for the eMBB service conflict as shown in the following figure. In this case, in addition to processing a PUSCH that meets a first channel determining condition and that carries the SP-CSI for the URLLC service as the first channel, processing may be preferentially performed based on types of services carried on different channels.

Specifically, a conflict between the channels for the URLLC service is separately processed, and a conflict between the channels for the eMBB service is separately processed. As shown in operation 2 in FIG. 11, a PUSCH is reused to send the HARQ-ACK for the URLLC service and the SP-CSI for the URLLC service. The PUSCH is reused to send the HARQ-ACK for the eMBB service and the SP-CSI for the eMBB service, to obtain a processing result shown in operation 3 in FIG. 10. In this case, a conflict has been resolved. This is not limited in this application.

Method 5

In a possible implementation, the first parameter information includes priority information of information carried on each of the plurality of channels.

Specifically, in a process of processing a channel conflict, a conflict between channels that carry higher-priority information is preferentially processed. After processing is completed, a channel with a second highest priority is selected from channels that still have conflicts, to resolve a conflict between the channel with the second highest priority and another channel. Then, the processing is repeated until the conflicts among all the channels are resolved.

In an embodiment, if a plurality of channels have a same priority, the method 5 and any one of the foregoing method 1 to method 4 may be used. For example, a channel with earlier sending time is preferentially processed based on a time sequence.

In an embodiment, if a channel carries information about a plurality of priorities, a highest priority in all the information is used for comparison.

It should be understood that in this case, a channel corresponding to highest-priority information is the first channel by default. Then, a conflict between the plurality of channels and the first channel is preferentially resolved. In other words, when the base station and the terminal device may agree that a channel is the first channel, the base station and the terminal device only need to determine the second channel from the plurality of channels that all conflict with the first channel, and then a conflict between the first channel and the second channel is processed. For example, a PUSCH that carries A-CSI or SP-CSI is used as the first channel. Each of the plurality of channels may be the PUSCH and/or a PUCCH, for example, a PUSCH and/or a PUCCH that carry/carries an SR, CSI, or a HARQ.

Alternatively, in an embodiment, the first channel may be a channel determined by the base station and the terminal device according to a specific rule. In the process described in the foregoing embodiment, a method for determining the second channel from the plurality of channels is described. When an actual situation permits, each solution for determining the second channel described in this application may be used to determine the first channel. In other words, the terminal device and the base station first determine a channel from conflicting channels as the first channel, then determine the second channel, and resolve the conflict between the first channel and the second channel. This is not limited in this application.

Figure 12:
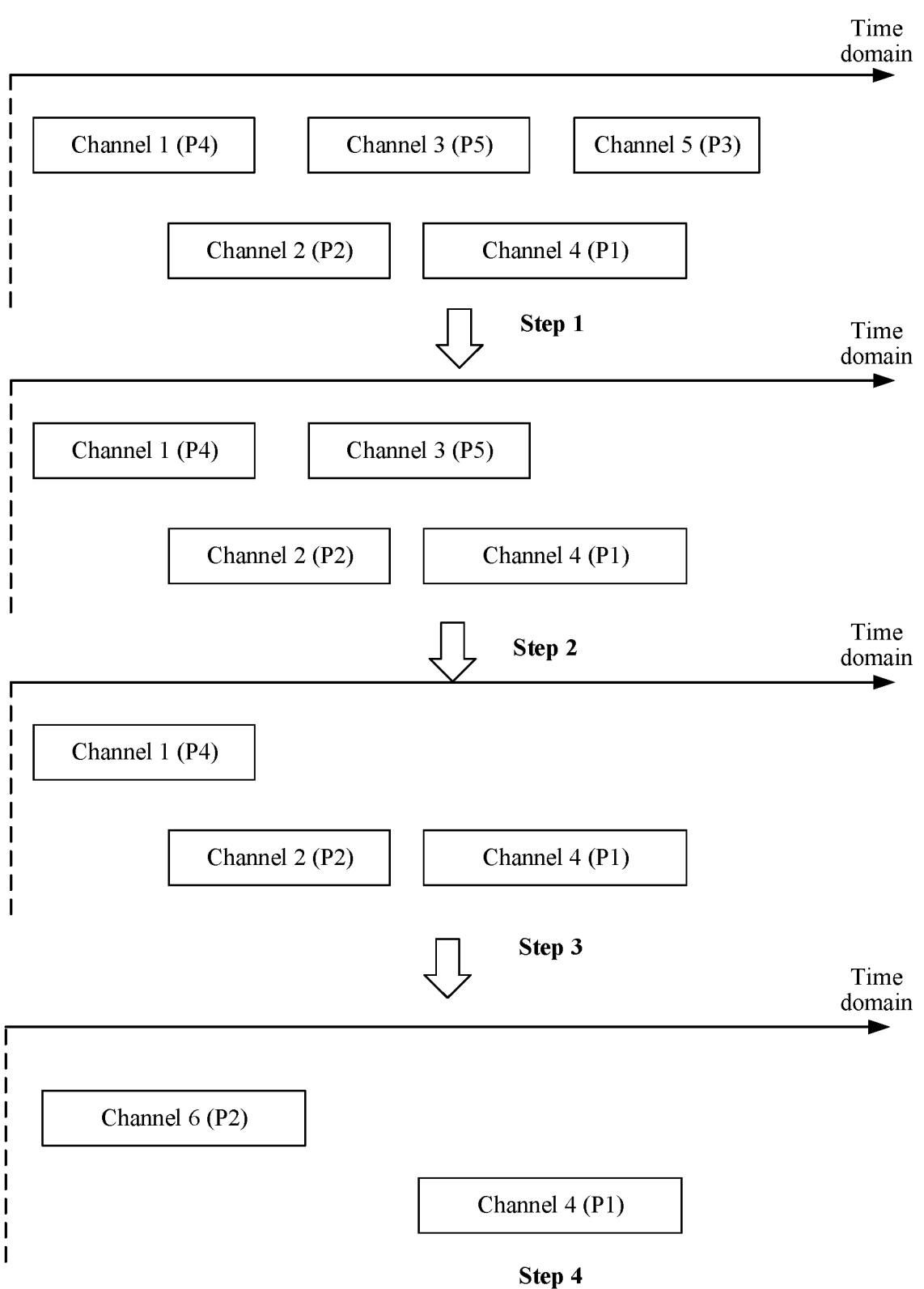
FIG. 12 is a schematic diagram of another resource determining process according to an embodiment of this application.

FIG. 12 is a schematic diagram of another resource determining process according to an embodiment of this application. Table 1 shows priority information of channels 1 to 5. With reference to Table 1 and FIG. 12, FIG. 12 shows that five different channels 1 to 5 overlap each other, and a priority level is defined as follows: P1>P2>P3>P4>P5.

TABLE 1

| Channel number | Priority |
|---|---|
| 1 | P 4 |
| 2 | P 2 |
| 3 | P 5 |
| 4 | P 1 |
| 5 | P 3 |

A priority of information carried on the channel 4 is highest, and therefore a conflict related to the channel 4 is first processed. A priority of the channel 5 is higher than a priority of the channel 3, and therefore a conflict between channel 4 and channel 5 is first processed. It is assumed that the channel 4 is reused to send information on the channel 5. In this case, the highest priority of the channel 4 is still P1. Because the channel 4 is reused to send the information on the channel 5, the information is not sent on the channel 5, and there are the remaining channels 1 to 4.

In operation 2 and operation 3 in FIG. 12, in remaining overlapping channels, the priority of the channel 4 is still the highest, and therefore the conflict related to the channel 4 is processed. It is assumed that the channel 3 is discarded, and there are the remaining channel 1, channel 2, and channel 4. The channel 4 does not conflict with another channel, and only the remaining channel 1 and the channel 2 conflict.

A channel 6 is reused to send information on the channel 1 and the channel 2, and the information is not sent on the channel 1 or the channel 2. The channel 6 carries information whose priorities are P2 and P4, and it is considered that a priority of the channel 6 is P2. If the channel 6 and the channel 4 do not conflict or overlap, a channel conflict processing process ends. A result of operation 4 in FIG. 12 is obtained.

It should be understood that there are a plurality of possible implementations of defining the priority.

In a possible implementation, it may be considered that different control information types have different priorities. For example, a HARQ-ACK> an SR> high-priority CSI> low-priority CSI; a URLLC service> an eMBB service> an mMTC service; a V2X service> the eMBB Service> the mMTC Service.

In an embodiment, the priority may be further determined based on a higher-layer indication and different QoS. This is not limited in this application.

According to the foregoing solution, the base station and the terminal device may determine a channel conflict resolution sequence based on a priority of information carried on a conflicting channel. In other words, a conflict of a channel that carries higher-priority information is preferentially processed. The channel determining method may retain and send as much control information as possible. This can improve reliability of transmission between the base station and the terminal device or between terminal devices.

Method 6

In a possible implementation, the plurality of channels are used to carry the control information and the first parameter information includes a type of the control information carried on the plurality of channels.

In an embodiment, the terminal device and the base station may perform processing based on a type of information carried on a channel.

For example, when a PUSCH that does not carry a UL-SCH, for example, a PUSCH that carries A-CSI or SP-CSI, conflicts with a plurality of PUCCHs/PUSCHs that carry different UCI types and a PUCCH and a PUSCH do not conflict, the different UCI types include HARQ information, CSI information, and SR information.

In a possible implementation, a processing sequence may be preferentially processing a conflict with an SR (positive or negative), then processing a conflict with CSI, and finally processing a conflict with a HARQ. Specifically, a conflict between the SR and the PUSCH is preferentially processed. Then, a conflict between a channel obtained after reprocessing and the CSI is processed. A conflict between a channel obtained in previous processing and the HARQ continues to be processed.

Figure 13:
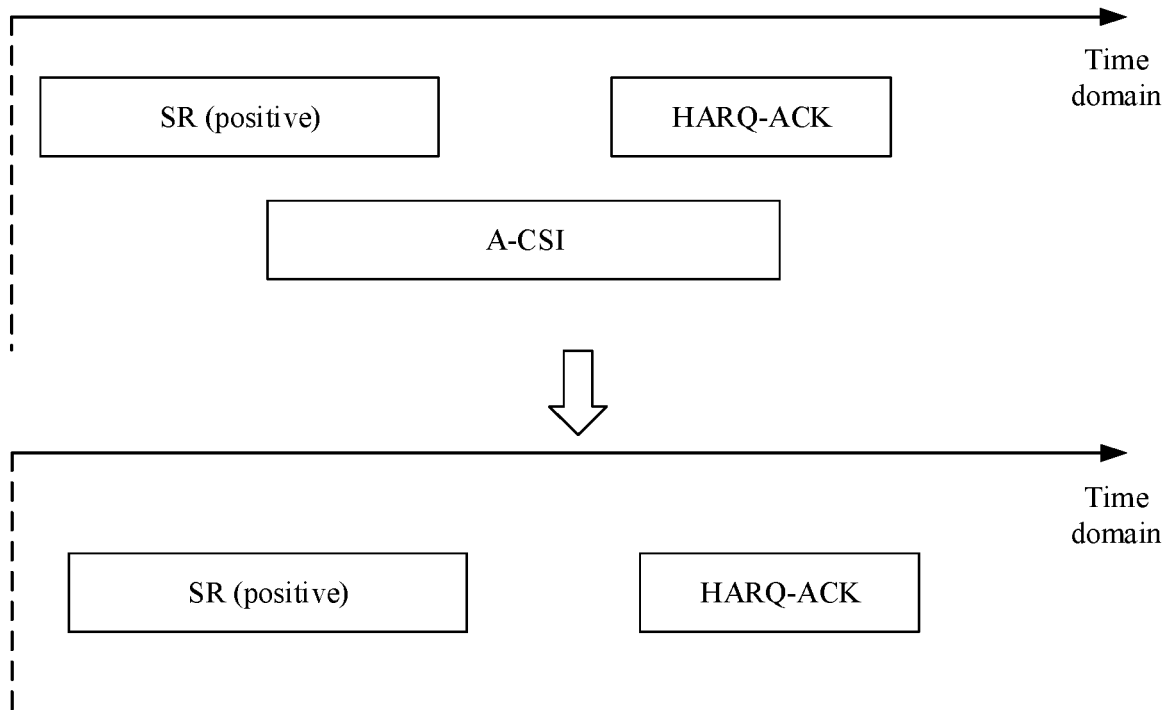
FIG. 13 is a schematic diagram of another resource selection process in a transmission process according to an embodiment of this application.

FIG. 13 is a schematic diagram of another resource selection process in a transmission process according to an embodiment of this application. As shown in FIG. 13, it is assumed that different PUCCHs and PUSCHs are in a same timeslot and have a same subcarrier (SCS) spacing. A conflict between a channel that carries an SR (positive) and a channel that carries A-CSI is preferentially processed, and the channel that carries the A-CSI is discarded. The HARQ and the SR are finally sent on the channel.

Figure 14:
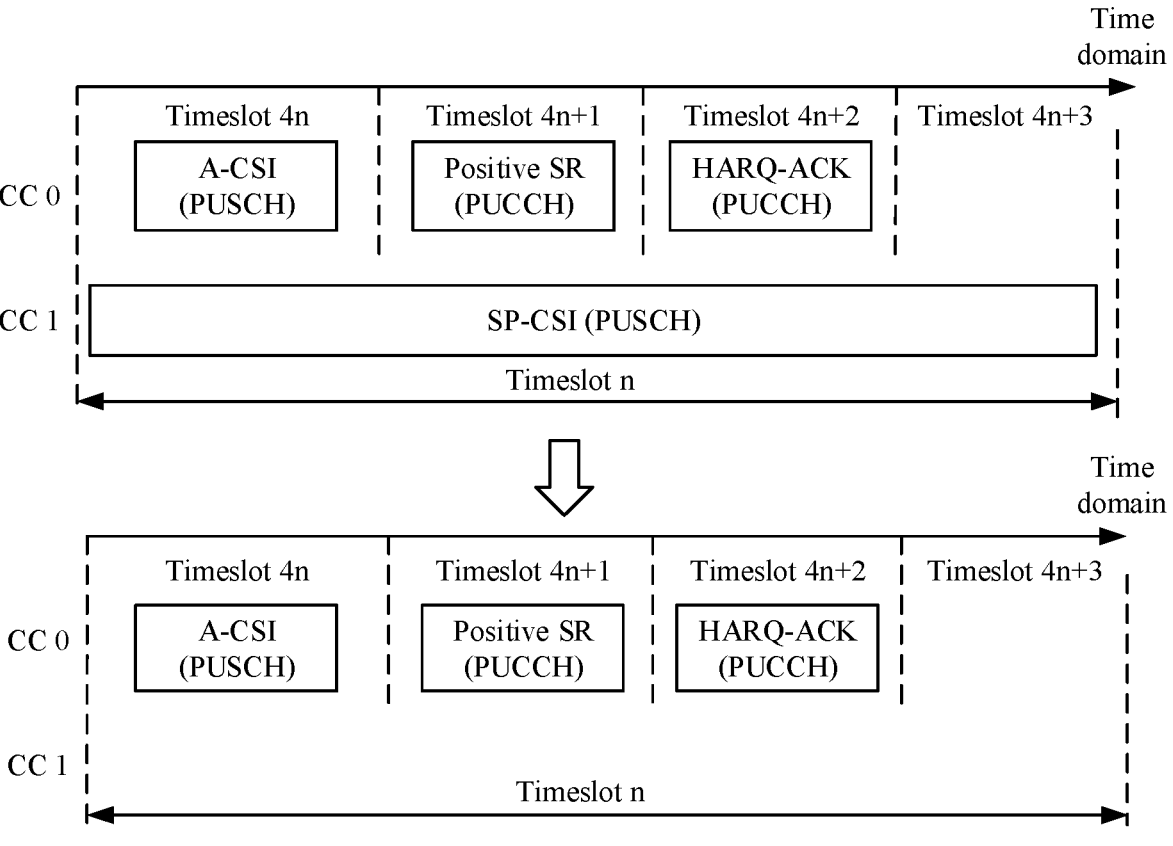
FIG. 14 is a schematic diagram of another resource selection process in a transmission process according to an embodiment of this application.

FIG. 14 is a schematic diagram of another resource selection process in a transmission process according to an embodiment of this application. As shown in FIG. 14, the PUCCH and the PUSCH may be located in different timeslots, different carriers (CCs), or serving cells, and also have different subcarrier spacings. A conflict between the PUSCH that carries the SP-CSI and the PUSCH that carries the A-CSI is preferentially processed, and the PUSCH that carries the SP-CSI is discarded. The A-CSI carried on the PUSCH, the SR (positive) carried on the PUCCH, and the HARQ-ACK carried on the PUCCH are finally sent.

Figure 15:
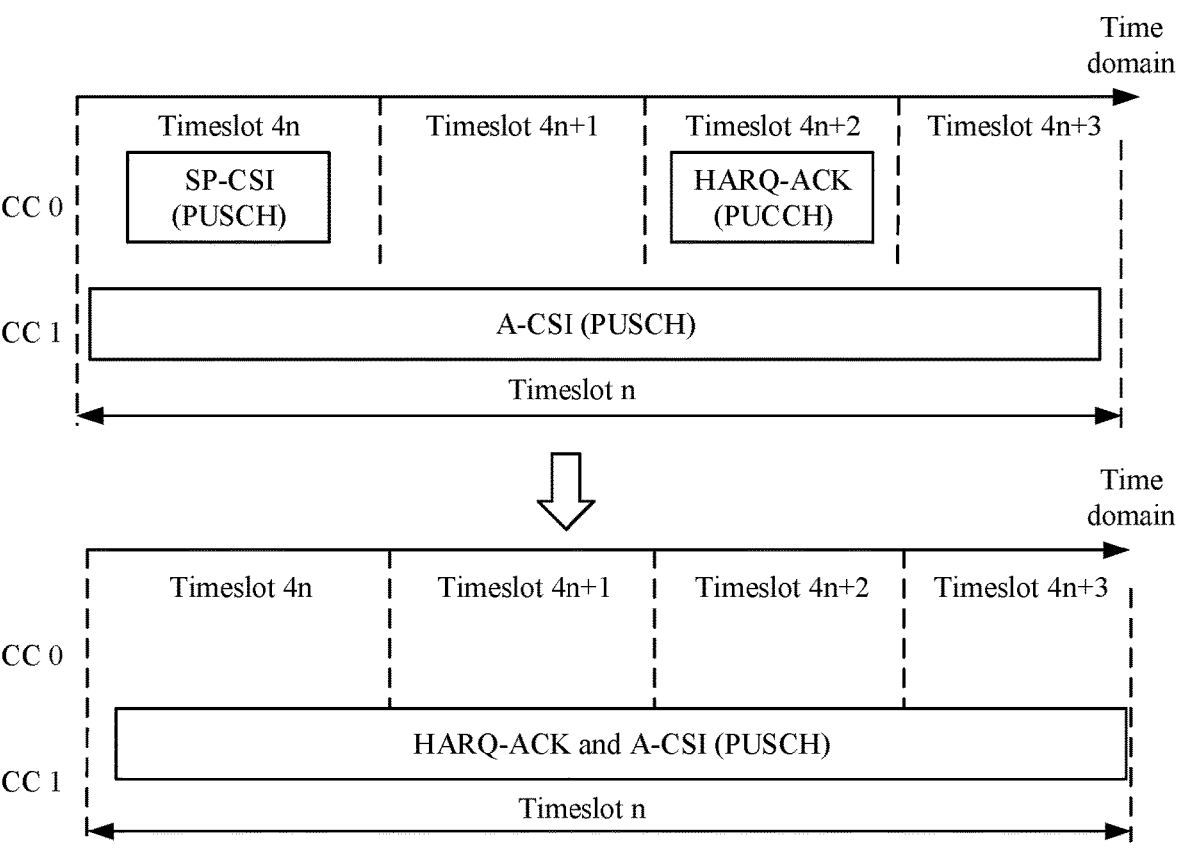
FIG. 15 is a schematic diagram of another resource selection process in a transmission process according to an embodiment of this application.

FIG. 15 is a schematic diagram of another resource selection process in a transmission process according to an embodiment of this application. As shown in FIG. 15, the PUCCH and the PUSCH may be located in different timeslots, different carriers (CCs), or serving cells. A conflict between the PUSCH that carries the A-CSI and the PUCCH that carries the HARQ-ACK is preferentially processed, so that the PUSCH that carries the A-CSI is reused to send the HARQ-ACK. Then, a conflict with the PUSCH that carries the SP-CSI is processed and the PUSCH that carries the SP-CSI is discarded. The HARQ-ACK and the A-CSI carried on the PUSCH are finally sent.

According to the foregoing technical solution, in a communication process between the base station and the terminal device, when one channel (the PUSCH) conflicts with the plurality of channels at the same time, but any two channels among the plurality of channels do not conflict, a same rule may be used so that the base station and the terminal device determine a to-be-transmitted channel according to a predefined processing sequence. Specifically, the base station and the terminal device may determine the channel conflict resolution sequence based on the type of information carried on the channel such as a type of uplink control information UCI, the sending time sequence of the conflicting channel, the scheduling sequence of the conflicting channel, the different service types carried on the conflicting channel, or the priority of information carried on the conflicting channel. The foregoing channel determining method may retain and send as much control information as possible. This can improve reliability of transmission between the base station and the terminal device or between terminal devices.

It should be understood that the channel determining method described above may be applied to communication between the terminal device and the base station, for example, an uplink communication process. The channel determining method described above may be further applied to communication between the terminal devices, for example, a sidelink communication process. This is not limited in this application.

The channel determining method in the embodiments of this application is described in detail above with reference to FIG. 1 to FIG. 15. Channel determining transmission apparatuses in the embodiments of this application are described in detail below with reference to FIG. 16 to FIG. 19.

Figure 16:
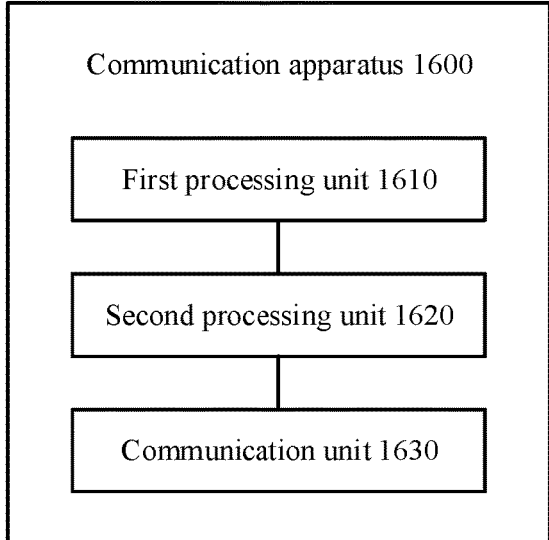
FIG. 16 is a schematic block diagram of a channel determining apparatus according to an embodiment of this application.

FIG. 16 is a schematic block diagram of a channel determining apparatus 1600 according to an embodiment of this application. The apparatus 1600 may correspond to the terminal device described in the foregoing method 500 and method 700, or may be a chip or a component used in the terminal device. Modules or units in the apparatus 1600 are respectively configured to perform actions or processing processes performed by the terminal device in the method 500 and the method 700. As shown in FIG. 16, the communication apparatus 1600 may include a first processing unit 1610, a second processing unit 1620, and a communication unit 1630.

The first processing unit 1610 is configured to determine a second channel from a plurality of channels based on first parameter information when a first channel overlaps each of the plurality of channels in time domain, and the plurality of channels do not overlap each other in time domain.

The second processing unit 1620 is configured to determine a to-be-sent channel from the first channel and the second channel.

In a possible implementation, the first parameter information includes information about a start time unit for sending each of the plurality of channels, and an index of a time unit for sending the second channel is smallest among indexes of time units of the plurality of channels.

In a possible implementation, the first parameter information includes information about a start symbol of each of the plurality of channels, and an index of a start symbol of the second channel is smallest among indexes of start symbols of the plurality of channels.

In a possible implementation, the apparatus further includes: the communication unit 1630, configured to receive a plurality of pieces of signaling, where the plurality of pieces of signaling are used to indicate time units for sending the plurality of channels, the first parameter information includes information about start time units for receiving the plurality of pieces of signaling, and an index of a time unit used to indicate signaling of the second channel is smallest among indexes of time units of the plurality of pieces of signaling.

In a possible implementation, the first parameter information includes information about a different service type carried on each of the plurality of channels.

In a possible implementation, the first channel and the second channel carry a same type of service.

In a possible implementation, the first parameter information includes priority information of information carried on each of the plurality of channels.

In a possible implementation, the plurality of channels are used to carry control information and the first parameter information includes a type of the control information carried on the plurality of channels.

In a possible implementation, a first processing unit is further configured to determine a channel that overlaps each of the plurality of channels in time domain as the first channel.

Specifically, the first processing unit 1610 is configured to perform S510 in the method 500, and the second processing unit 1620 is configured to perform S520 in the method 500. A specific process in which each unit performs the foregoing corresponding operations has been described in detail in the method 500. For brevity, details are not described herein again.

Figure 17:
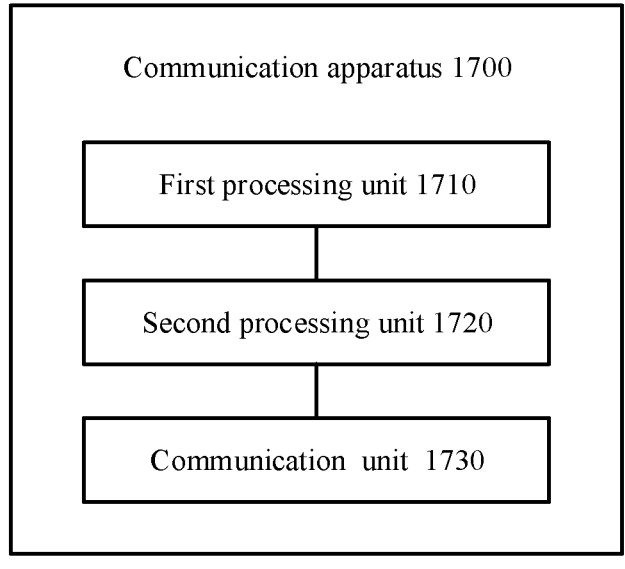
FIG. 17 is a schematic block diagram of a channel determining apparatus according to an embodiment of this application.

FIG. 17 is a schematic block diagram of a channel determining apparatus 1700 according to an embodiment of this application. The apparatus 1700 may correspond to the base station described in the foregoing method 500, or may be a chip or a component used in the base station. Modules or units in the apparatus 1700 are respectively configured to perform actions or processing processes performed by the base station in the method 500. As shown in FIG. 17, the communication apparatus 1700 may include a first processing unit 1710, a second processing unit 1720, and a communication unit 1730.

The first processing unit 1710 is configured to determine a second channel from a plurality of channels based on first parameter information when a first channel overlaps each of the plurality of channels in time domain, and the plurality of channels do not overlap each other in time domain.

The second processing unit 1720 is configured to determine a to-be-sent channel from the first channel and the second channel.

In a possible implementation, the first parameter information includes information about a start time unit for sending each of the plurality of channels, and an index of a time unit for sending the second channel is smallest among indexes of time units of the plurality of channels.

In a possible implementation, the first parameter information includes information about a start symbol of each of the plurality of channels, and an index of a start symbol of the second channel is smallest among indexes of start symbols of the plurality of channels.

In a possible implementation, the apparatus further includes: the communication unit 1730, configured to send a plurality of pieces of signaling, where the plurality of pieces of signaling are used to indicate time units for sending the plurality of channels, the first parameter information includes information about start time units for receiving the plurality of pieces of signaling, and an index of a time unit used to indicate signaling of the second channel is smallest among indexes of time units of the plurality of pieces of signaling.

In a possible implementation, the first parameter information includes information about a different service type carried on each of the plurality of channels.

In a possible implementation, the first channel and the second channel carry a same type of service.

In a possible implementation, the first parameter information includes priority information of information carried on each of the plurality of channels.

In a possible implementation, the plurality of channels are used to carry control information and the first parameter information includes a type of the control information carried on the plurality of channels.

In a possible implementation, a first processing unit is further configured to determine a channel that overlaps each of the plurality of channels in time domain as the first channel.

Specifically, the first processing unit 1710 is configured to perform S510 in the method 500, and the second processing unit 1720 is configured to perform S520 in the method 500. A specific process in which each unit performs the foregoing corresponding operations has been described in detail in the method 500. For brevity, details are not described herein again.

Figure 18:
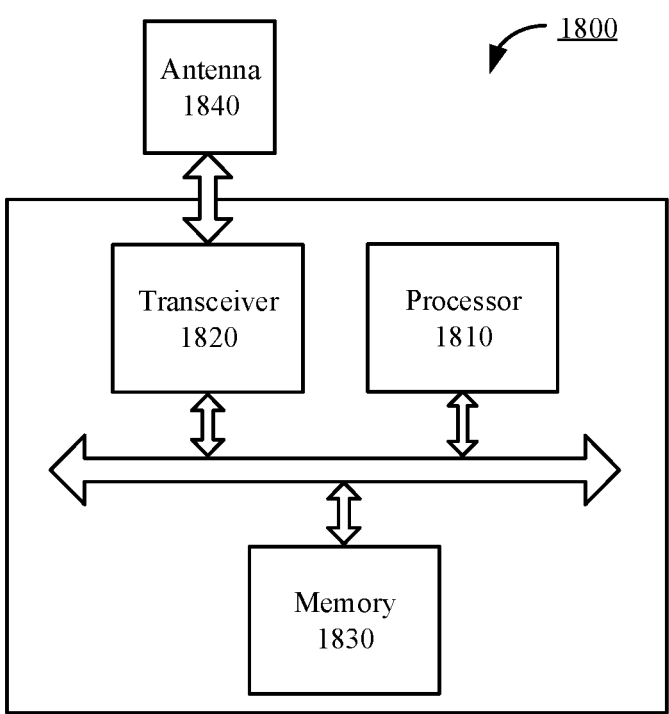
FIG. 18 is a schematic diagram depicting a structure of a terminal device according to an embodiment of this application.

FIG. 18 is a schematic diagram depicting a structure of a terminal device 1800 according to an embodiment of this application. As shown in FIG. 18, the terminal device 1800 includes a processor 1810 and a transceiver 1820. In an embodiment, the terminal device 1800 further includes a memory 1830. The processor 1810, the transceiver 1820, and the memory 1830 communicate with each other through an internal connection path, to transfer a control signal and/or a data signal. The memory 1830 is configured to store a computer program. The processor 1810 is configured to invoke the computer program from the memory 1830 and run the computer program, to control the transceiver 1820 to send or receive a signal.

The processor 1810 and the memory 1830 may be integrated into one processing apparatus. The processor 1810 is configured to execute program code stored in the memory 1830, to implement functions of the terminal device in the foregoing method embodiments. During specific implementation, the memory 1830 may alternatively be integrated into the processor 1810, or may be independent of the processor 1810. The transceiver 1820 may be implemented by using a transceiver circuit.

The terminal device may further include an antenna 1840. The antenna 1840 is configured to send, by using a radio signal, uplink data or uplink control signaling that is output by the transceiver 1820, or send, after receiving downlink data or downlink control signaling, the downlink data or the downlink control signaling to the transceiver 1820 for further processing.

It should be understood that, the apparatus 1800 may correspond to the terminal device in a method 500 according to the embodiment of this application, and the apparatus 1800 may alternatively be a chip or a component used in the terminal device. In addition, modules in the apparatus 1800 implement corresponding procedures in the method 500 in FIG. 5. Specifically, the memory 1830 is configured to store the program code, so that when the processor 1810 executes the program code, the processor 1810 is controlled to perform S510 and S520 in the method 500. A specific process of performing the foregoing corresponding operations by the units is described in detail in the method 500. For brevity, details are not described herein.

Figure 19:
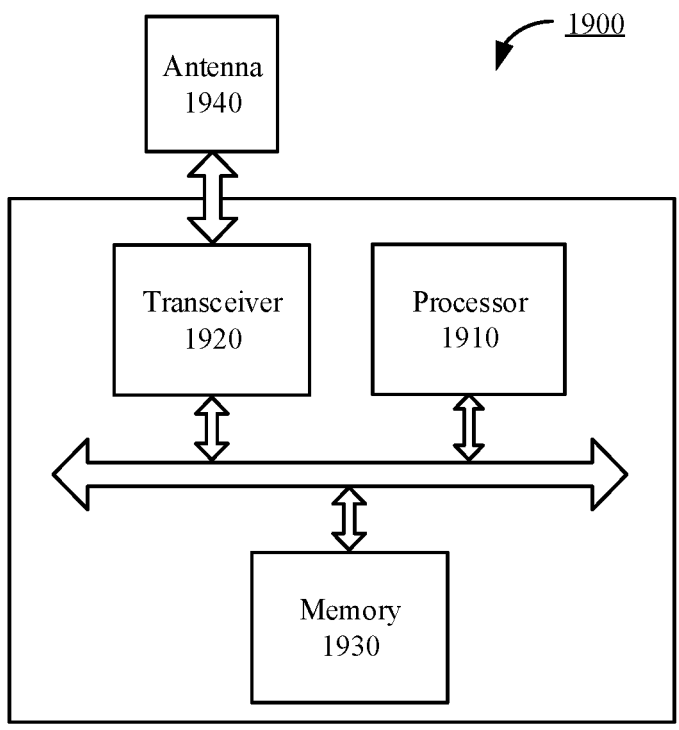
FIG. 19 is a schematic diagram depicting a structure of a network device according to an embodiment of this application.

FIG. 19 is a schematic diagram depicting a structure of a network device 1900 according to an embodiment of this application. As shown in FIG. 19, the network device 1900 (for example, a base station) includes a processor 1910 and a transceiver 1920. In an embodiment, the network device 1900 further includes a memory 1930. The processor 1910, the transceiver 1920, and the memory 1930 communicate with each other through an internal connection path, to transfer a control signal and/or a data signal. The memory 1930 is configured to store a computer program. The processor 1910 is configured to invoke the computer program from the memory 1930 and run the computer program, to control the transceiver 1920 to send or receive a signal.

The processor 1910 and the memory 1930 may be integrated into one processing apparatus. The processor 1910 is configured to execute program code stored in the memory 1930 to implement functions of the base station in the foregoing method embodiments. During specific implementation, the memory 1930 may alternatively be integrated into the processor 1910, or may be independent of the processor 1910. The transceiver 1920 may be implemented by using a transceiver circuit.

A network device may further include an antenna 1940, configured to send, by using a radio signal, downlink data or downlink control signaling that is output by the transceiver 1920, or send, after receiving uplink data or uplink control signaling, the uplink data or the uplink control signaling to the transceiver 820 for further processing.

It should be understood that, the apparatus 1900 may correspond to a base station in a method 500 according to the embodiment of this application, and the apparatus 1900 may alternatively be a chip or a component used in the base station. In addition, modules in the apparatus 1900 implement corresponding procedures in the method 500 in FIG. 5. Specifically, the memory 1930 is configured to store program code, so that when the processor 1910 executes the program code, the processor 1910 is controlled to perform S510 and S520 in the method 500. A specific process of performing the foregoing corresponding operations by the units is described in detail in the method 500. For brevity, details are not described herein again.

A person of ordinary skill in the art may be aware that, in combination with the examples described in the embodiments disclosed in this specification, units and algorithm operations can be implemented by electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium that can store program code includes any medium, for example, a USB flash drive, a removable hard disk, a read-only memory (ROM), a random access memory (RAM), a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel determining method, comprising:
   when a first channel overlaps each of a plurality of channels in a time domain, and the plurality of channels do not overlap each other in the time domain, determining a second channel from the plurality of channels based on first parameter information, to resolve a conflict between the first channel and the second channel, wherein the first channel is a physical uplink control channel (PUCCH) that carries a scheduling request (SR) and a PUCCH that carries a hybrid automatic repeat request (HARQ) conflict with a PUSSH that carries a conflict with channel state information (A-CSI) at the same time, but the PUCCH that carries the SR does not conflict with the PUCCH that carries HARQ, wherein the plurality of channels are used to carry control information and the first parameter information comprises a type of the control information carried on the plurality of channels, wherein a conflict resolution sequence between channels is determined based on the type of the control information carried on each of the plurality of channels, and wherein a conflict between channels that carry information about a same service type is preferentially processed then a conflict between the channels that carry the information about different service types, and wherein the conflict resolution sequence is to preferentially process a conflict with the SR, then a conflict with the CSI), and then a conflict with the HARQ, wherein the conflict between the SR and the PUSCH is preferentially processed, then the conflict between a channel obtained after reprocessing and the CSI is processed, and the conflict between a channel obtained in previous processing and the HARQ continues to be processed; and determining a to-be-sent channel or a to-be-received channel from the first channel and the second channel.

2. The channel determining method according to claim 1, wherein the first parameter information comprises information about a start time unit for sending each of the plurality of channels, and wherein an index of a time unit for sending the second channel is a smaller index than other indexes of time units of the plurality of channels, wherein a smaller index of the time unit corresponds to an earlier sending time.

3. The channel determining method according to claim 1, wherein the first parameter information comprises information about a start symbol of each of the plurality of channels, and wherein an index of a start symbol of the second channel is a smaller index than other indexes of start symbols of the plurality of channels.

4. The channel determining method according to claim 1, wherein the method further comprises:

receiving or sending a plurality of signaling, wherein the plurality of signaling are used to indicate time units for sending the plurality of channels; and the first parameter information comprises information about start time units for receiving the plurality of signaling, and an index of a time unit used to indicate signaling of the second channel is a smaller index than other indexes of time units of the plurality of signaling.

5. The channel determining method according to claim 1, wherein the first parameter information comprises information about a different service type carried on each of the plurality of channels.

6. The channel determining method according to claim 5, wherein the first channel and the second channel carry a same type of service.

7. The channel determining method according to claim 1, wherein the first parameter information comprises priority information of information carried on each of the plurality of channels.

8. The channel determining method according to claim 1, wherein the method further comprises:

determining a channel that overlaps each of the plurality of channels in the time domain as the first channel.

9. A resource determining apparatus, comprising:

at least one processor; and a memory storing programming instructions for execution by the at least one processor, the programming instructions instructing a network device to perform operations comprising:

when a first channel overlaps each of a plurality of channels in a time domain, and the plurality of channels do not overlap each other in the time domain, determining a second channel from the plurality of channels based on first parameter information, to resolve a conflict between the first channel and the second channel, wherein the first channel is a physical uplink control channel (PUCCH) that carries a scheduling request (SR) and a PUCCH that carries a hybrid automatic repeat request (HARQ) conflict with a PUSSH that carries a conflict with channel state information (A-CSI) at the same time, but the PUCCH that carries the SR does not conflict with the PUCCH that carries HARQ, wherein the plurality of channels are used to carry control information and the first parameter information comprises a type of the control information carried on the plurality of channels, wherein a conflict resolution sequence between channels is determined based on the type of the control information carried on each of the plurality of channels, and wherein a conflict between channels that carry information about a same service type is preferentially processed then a conflict between the channels that carry the information about different service types, and wherein the conflict resolution sequence is to preferentially process a conflict with the SR, then a conflict with the CSI, and then a conflict with the HARQ, wherein the conflict between the SR and the PUSCH is preferentially processed, then the conflict between a channel obtained after reprocessing and the CSI is processed, and the conflict between a channel obtained in previous processing and the HARQ continues to be processed; and determining a to-be-sent channel or a to-be-received channel from the first channel and the second channel.

10. The resource determining apparatus according to claim 9, wherein the first parameter information comprises information about a start time unit for sending each of the plurality of channels, and wherein an index of a time unit for sending the second channel is a smaller index than other indexes of time units of the plurality of channels, wherein a smaller index of the time unit corresponds to an earlier sending time.

11. The resource determining apparatus according to claim 9, wherein the first parameter information comprises information about a start symbol of each of the plurality of channels, and wherein an index of a start symbol of the second channel is a smaller index than other indexes of start symbols of the plurality of channels.

12. The resource determining apparatus according to claim 9, wherein the operations further comprise:

receiving or sending a plurality of signaling, wherein the plurality of signaling are used to indicate time units for sending the plurality of channels; and wherein the first parameter information comprises information about start time units for receiving the plurality of signaling, and wherein an index of a time unit used to indicate signaling of the second channel is a smaller index than other indexes of time units of the plurality of signaling.

13. The resource determining apparatus according to claim 9, wherein the first parameter information comprises information about a different service type carried on each of the plurality of channels.

14. The resource determining apparatus according to claim 13, wherein the first channel and the second channel carry a same type of service.

15. The resource determining apparatus according to claim 9, wherein the first parameter information comprises priority information of information carried on each of the plurality of channels.

16. The resource determining apparatus according to claim 9, wherein the operations further comprise:

determining a channel that overlaps each of the plurality of channels in the time domain as the first channel.

17. A non-transitory storage medium storing computer program codes which, when executed by a processor of a communication device, cause the communication device to perform operations of:

when a first channel overlaps each of a plurality of channels in a time domain, and the plurality of channels do not overlap each other in the time domain, determining a second channel from the plurality of channels based on first parameter information, to resolve a conflict between the first channel and the second channel, wherein the first channel is a physical uplink control channel (PUCCH) that carries a scheduling request (SR) and a PUCCH that carries a hybrid automatic repeat request (HARQ) conflict with a PUSSH that carries a conflict with channel state information (A-CSI) at the same time, but the PUCCH that carries the SR does not conflict with the PUCCH that carries HARQ, wherein the plurality of channels are used to carry control information and the first parameter information comprises a type of the control information carried on the plurality of channels, wherein a conflict resolution sequence between channels is determined based on a service type carried on each of the plurality of channels, and wherein a conflict between channels that carry information about a same service type is preferentially processed then a conflict between the channels that carry the information about different service types, and wherein the conflict resolution sequence is to preferentially process a conflict with the SR, then a conflict with the CSI, and then a conflict with the HARQ, wherein the conflict between the SR and the PUSCH is preferentially processed, then the conflict between a channel obtained after reprocessing and the CSI is processed, and the conflict between a channel obtained in previous processing and the HARQ continues to be processed; and determining a to-be-sent channel or a to-be-received channel from the first channel and the second channel.

18. The non-transitory storage medium according to claim 17, wherein the operations further comprise:

receiving or sending a plurality of signaling, wherein the plurality of signaling are used to indicate time units for sending the plurality of channels; and wherein the first parameter information comprises information about start time units for receiving the plurality of signaling, and an index of a time unit used to indicate signaling of the second channel is a smaller index than other indexes of time units of the plurality of signaling.

\* \* \* \* \*